(12) United States Patent
Quaghebeur et al.

(10) Patent No.: US 8,709,151 B2
(45) Date of Patent: Apr. 29, 2014

(54) PRODUCTION OF A MAINLY CARBONATE BONDED ARTICLE BY CARBONATION OF ALKALINE MATERIALS

(75) Inventors: Mieke Quaghebeur, Malle (BE); Ben Laenen, Geel (BE); Peter Nielsen, Hoeilaart (BE)

(73) Assignee: Carbstone Innovation NV, Genk (BE)

( * ) Notice: Subject to any disclaimer, the term of this patent is extended or adjusted under 35 U.S.C. 154(b) by 262 days.

(21) Appl. No.: 12/989,932

(22) PCT Filed: Apr. 28, 2009

(86) PCT No.: PCT/EP2009/055154
§ 371 (c)(1),
(2), (4) Date: Jan. 6, 2011

(87) PCT Pub. No.: WO2009/133120
PCT Pub. Date: Nov. 5, 2009

(65) Prior Publication Data
US 2011/0165400 A1 Jul. 7, 2011

(30) Foreign Application Priority Data

Apr. 28, 2008 (WO) .................. PCT/EP2008/055195

(51) Int. Cl.
*C04B 14/28* (2006.01)

(52) U.S. Cl.
USPC .................... 106/713; 714/738; 714/789

(58) Field of Classification Search
USPC ............... 423/430, 437.1, 438; 106/713, 714, 106/738, 789
See application file for complete search history.

(56) References Cited

U.S. PATENT DOCUMENTS

| | | |
|---|---|---|
| 2,496,895 A | 2/1950 | Staley |
| 5,639,373 A | 6/1997 | Mahendran et al. |

(Continued)

FOREIGN PATENT DOCUMENTS

| | | |
|---|---|---|
| EP | 0 931 582 A1 | 7/1999 |
| GB | 2 356 194 | 5/2001 |

(Continued)

OTHER PUBLICATIONS

Teramura et al., "New building material from waste concrete by carbonation," *Journal of Materials in Civil Engineering* (2000) 12 (4): 288-293. XP008099649.

Johnson et al., "Solidification of stainless steel slag by accelerated carbonation," *Experimental Technology* (2003) 24: 671-678. XP008099611.

(Continued)

*Primary Examiner* — Paul Marcantoni
(74) *Attorney, Agent, or Firm* — Merchant & Gould P.C.

(57) ABSTRACT

A method of producing a mainly carbonate bonded article includes a step of providing an alkaline granular material having one or more alkaline earth metal silicate phases. The method includes a step of compacting the granular material to obtain a compact of the granular material. The porosity of the compact is smaller than or equal to 37% by volume. The intrinsic permeability of the compact is at least $1 \cdot 10^{-12}$ cm$^2$. The method also includes a reacting step arranged to form at least 5% by weight of carbonates ($CO_3^{2-}$), by reacting the granular material with carbon dioxide in the presence of water, thus transforming the compact into the article. In the reacting step, the compact, being unsaturated with moisture at the beginning of the reacting step, is brought in an atmosphere having carbon dioxide. The atmosphere is at a temperature of at least 70° C. and at a pressure of at least 0.5 MPa. The pressure is also higher than the saturated vapor pressure of water at the temperature. As a result, at least a portion of the carbonates are formed by reaction of the one or more alkaline earth metal silicate phases. Articles are also obtained by the method.

30 Claims, 13 Drawing Sheets

(56) References Cited

U.S. PATENT DOCUMENTS

| | | | |
|---|---|---|---|
| 5,744,078 | A | 4/1998 | Soroushian et al. |
| 6,264,736 | B1 | 7/2001 | Knopf et al. |
| 6,334,885 | B1 | 1/2002 | Fukushima et al. |
| 6,637,412 | B1 | 10/2003 | Klee et al. |
| 8,137,455 | B1 * | 3/2012 | Constantz et al. ............ 106/738 |
| 8,177,909 | B2 * | 5/2012 | Constantz et al. ............ 106/738 |
| 8,333,944 | B2 * | 12/2012 | Constantz et al. ............ 423/225 |
| 2011/0017101 | A1 * | 1/2011 | Nguy n et al. ................ 106/714 |
| 2012/0195814 | A1 * | 8/2012 | Descamps et al. ............ 423/111 |

FOREIGN PATENT DOCUMENTS

| | | |
|---|---|---|
| JP | 5-220357 | 8/1993 |
| JP | 2000-203903 | 7/2000 |
| JP | 2000-247711 | 9/2000 |
| WO | WO 02/22244 A1 | 3/2002 |

OTHER PUBLICATIONS

Gerven et al., "Carbonation of MSWI-bottom ash to decrease heavy metal leaching, in view of recycling," *Waste Management* (2005) 25: 291-300. XP002509525.

Andersen et al., "A guide to determining the optimal gradation of concrete aggregates," *National Academy of Science* (1993): 1-16. XP002549470.

Bertos et al., "A review of accelerated carbonation technology in the treatment of cement-based materials and sequestration of $CO_2$," *Journal of Hazardous Materials B112* (2004): 193-205.

Monkman et al., "Assessing the carbonation behavior of cementitious materials," *Journal of Materials in Civil Engineering* (2005) 18 (6): 768-776. XP008100151.

Todorvic et al., "Artificial carbonation for controlling the mobility of critical elements in bottom ash," *J. Mater. Cycles. Waste Manag.* (2006) 8: 145-153. XP002509526.

\* cited by examiner

PRODUCTION OF A MAINLY CARBONATE BONDED ARTICLE BY CARBONATION OF ALKALINE MATERIALS

This application is a National Stage Application of PCT/EP2009/055154, filed Apr. 28, 2009, which claims benefit of PCT/EP2008/055195, filed Apr. 28, 2008 and which applications are incorporated herein by reference. To the extent appropriate, a claim of priority is made to each of the above disclosed applications.

FIELD OF THE INVENTION

The present invention is related to a method of production of an article by carbonation of materials comprising reactive sources of alkaline earth metal silicates. The resulting article is bonded mainly by the carbonates formed during the carbonation reaction. In particular, the invention is related to methods of production of non cement-based articles. The method of the invention can be used for sequestering $CO_2$ and/or for producing an article having high compressive strength and/or for recycling waste materials. The invention is also related to an article comprising carbonates and advantageously having a high compressive strength.

STATE OF THE ART

The idea to stabilise cementitious materials and slags having pozzolanic or latent hydraulic binding properties by accelerated carbonation is known. Such accelerated carbonation aims mainly at accelerating the curing of the cementitious binder, by accelerating the hydration of tricalcium silicates ($C_3S$) to calcium silicate hydrates (CSH), rather than forming a large amount of carbonates. The hydration of tricalcium silicates ($C_3S$) forms portlandite ($Ca(OH)_2$) as a by-product, which can be carbonated.

In "A review of accelerated carbonation technology in the treatment of cement-based materials and sequestration of $CO_2$", Journal of Hazardous Materials B112, 2004, pp. 193-205, Bertos et al. give an overview of the state of the art in the application of accelerated carbonation technology using "dry" carbonation routes, wherein a mineral material, which is subjected to carbonation is not brought in suspension. The authors summarise the reaction conditions used to stabilise cement-solidified waste, to accelerate the curing of compacted cementitious systems and to recycle non-hazardous wastes to produce useful products by carbonation reactions.

From the process conditions described it becomes clear that the cited methods of carbonating reactive mineral materials use low temperature and low to slightly elevated pressure (up to 0.3 MPa). The authors report that the uptake of $CO_2$ decreases at temperatures above 60° C. due to a decrease of the solubility of $CO_2$ in water. This makes elevated temperatures unfavourable for the carbonation of mineral materials with the aim of producing strong building materials. Moreover, high temperatures result in the formation of unstable polymorphs of calcite. The authors conclude that in order to obtain stable products, the process should be kept at low temperatures (0-10° C.) and slightly positive $CO_2$-pressures.

U.S. Pat. No. 5,744,078 discloses a method for accelerated processing of pressed cement-bonded particleboard or fibreboard through the injection of a diluted carbon dioxide gas. A composition for cement-bonded particleboard or fibreboard is spread between two platens of a press, whereafter the press is closed in order to compact the board to a thickness of not more than 40 mm. At one or both of the top and bottom surfaces, diluted carbon dioxide gas is injected and vented. The process lasts for a few minutes, whereafter the press is opened and the board has sufficient strength for handling, the ultimate strength being gained after few days in ambient conditions. Initial strength of the board directly after accelerated curing was reported to be 50% of the ultimate strength.

Since, in the process described above, the contact time between carbon dioxide and the cement composition is limited, possibilities of carbon dioxide sequestration by carbonation will be limited. This can also be seen, since a diluted, rather than a concentrated, carbon dioxide gas mixture is used, which is moreover vented through the cement composition, such that no or a very small pressure is built up in the boards.

Furthermore, even though the process described is suitable for the fabrication of relatively thin parts (up to 40 mm thickness), it would be difficult to achieve sufficient $CO_2$ penetration for thicker parts. Moreover, supplying the $CO_2$ to one face only induces a carbonation front (gradient) in thicker parts. The associated volume expansion could induce internal shear stresses causing microcracks with a consequent drop in mechanical properties.

U.S. Pat. No. 6,334,885 discloses a method of accelerated curing of mixtures of steelmaking slag and a fine powder of ground granulated blast furnace (GGBF) slag by a hydration reaction. By supplying high-pressure steam, tobermorite, which is a crystalline hydrated silicate phase, is formed, rather than amorphous CSH formed in cementitious materials under ambient conditions. By addition of carbon dioxide gas to the high-pressure steam, the formation of calcium carbonate is reported. However, high-pressure steam treatment of 100% GGBF slag and of 100% steelmaking slag, with addition of carbon dioxide, did not lead to solidification of the samples tested. Consequently, the main binding phase in the articles is indeed formed by hydrated calcium silicates (tobermorite).

In the $CO_2$-treated products described above the particles are bonded mainly by hydrated cement phases. For non cement-bonded materials, carbonation routes have also been disclosed. Patent applications JP 2000/203903 and JP 2000/247711 disclose methods of producing artificial stone material for use in seawater, by carbonation of steelmaking slags. The slag in powder form is moisturized and loaded in a vessel to form a packed bed. A gas containing carbon dioxide is blown in the vessel to form a solidified material, having $CaCO_3$, which is formed by the carbonation reaction, as a binder. The reaction is carried out at a temperature below 60° C. in order to prevent cracking of the stone. A processing time of six days is disclosed. Strengths for the artificial stone up to 12 MPa are reported. A drawback of this method is that the processing time is long.

In "Solidification of stainless steel slag by accelerated carbonation", Environmental technology, vol. 24, 2003, pp. 671-678, Johnson et al. disclose to expose compressed (under a pressure of 0.5 MPa), ground slag compacts from stainless steel production with 12.5 weight percent water to carbon dioxide at a pressure of 3 bars. As a result, formed calcium carbonate causes the slag to self-cement. Compressive strengths of 9 MPa were recorded in the final reaction product for ground slag having a particle size less than 125 µm. A compressive strength of 9 MPa is however not sufficient for the carbonated material to be used as a building and construction material.

In order to increase the reactivity of the mineral material, research has moved towards aqueous carbonation routes in recent years. In these "wet" methods, the reactive mineral material is first brought into suspension. In a subsequent step, acids, electrolytes or a caustic material (e.g., NaOH) can be added in order to release the reactive cations and thus increase the reactivity of the mineral material. The suspension is then exposed to $CO_2$ to convert the reactive cations into carbonates. "Wet" carbonation techniques have the ability to increase the reactivity and the $CO_2$ sequestration of mineral materials and to control the leaching properties of waste products, but the use of a suspension make them unfit for the direct production of artificial stones.

SUMMARY OF THE INVENTION

An aspect of the present invention relates to improved methods of carbonation for producing mainly carbonate-bonded articles.

Another aspect of the invention relates to a mainly carbonate-bonded article, such as an artificial stone, comprising alkaline earth metal carbonates, the article having improved mechanical and/or physico-chemical properties compared to carbonated articles of the prior art.

The invention provides for a method of producing a mainly carbonate bonded article by carbonation as set out in the appended claims. The invention further provides a mainly carbonate bonded article comprising carbonates as set out in the appended claims.

According to a first aspect of the invention, there is provided a method of producing an article by carbonation of a granular material. The article is mainly carbonate bonded, which refers to the fact that the particles of the granular material are mainly bonded to one another by means of the carbonate phases formed. The carbonates that are formed by the carbonation reactions in methods of the invention hence compose the main binding phases. By the expression "mainly carbonate bonded" is meant in the present specification that the carbonate phase or phases formed by the carbonation step contribute advantageously for more than 50% in the final compressive strength of the article. This means that by performing treatment according to methods of the invention, but in absence of $CO_2$, the final compressive strength of the article would be less than 50% of the final compressive strength obtained by treatment with $CO_2$.

The method comprises a first step of providing an alkaline granular material, which refers to a granular material having a pH higher than or equal to 8.3. Where the term "granular material" is used in the following, this is to be understood as alkaline granular material as defined above. The alkaline granular material can be a mixture of different granular materials, all of which do not need to be alkaline, as long as the mixture is alkaline as indicated. The alkaline granular material comprises one or more alkaline earth metal silicate phases.

Subsequently, a step of compacting the granular material to obtain a compact of the granular material is provided. The compacting step is so arranged that, in combination with a selection of the granular material and in particular the granulometry thereof, a compact is obtained having a porosity smaller than or equal to 37% by volume and an intrinsic permeability of at least $1 \cdot 10^{-12}$ cm$^2$. As will be shown, multiple different combinations of compacting parameters and (granulometry) compositions of granular material can be found for obtaining the compact as indicated.

The method further comprises the step of reacting the granular material in said compact with carbon dioxide in the presence of water to form at least 5% by weight of carbonates (i.e. the weight of $CO_3^{2-}$ anions, cations of the carbonates not included), thus transforming the compact into the article. The indicated amount of carbonates formed in the reacting step is based on dry weight of the mainly carbonate bonded article and is preferably calculated based on $CO_2$ uptake. In the reacting step, the compact, being unsaturated with moisture at the beginning of the reacting step, is put in an atmosphere comprising said carbon dioxide. The atmosphere is at a temperature of at least 70° C. and at a pressure of at least 0.5 MPa.

An additional reaction condition, according to the present aspect, is that said pressure is higher than the saturated vapour pressure of water at said temperature. This prevents cracking caused by expansion (boiling) of water (moisture) present in the pores of the compact. Therefore, when an excess of water is formed during carbonation, this water is expelled out of the compact in a liquid rather than gaseous state during the reacting step.

Preferably, said pressure is higher than the saturated vapour pressure of water at the temperature within the compact. The temperature of the compact can rise substantially due to exothermic reactions of carbonation. This however depends on the composition of granular material.

Furthermore, the compact, prior to the reacting step, should preferably not be exposed to temperatures exceeding the boiling temperature of water at the pressure of the compact. This is to prevent any boiling of water within the compact prior to and during at least an initial phase of the reacting step.

As a result, said alkaline earth metal silicate phase takes part in the reaction with carbon dioxide and thus contributes in the formation of the carbonates (the alkaline earth metal is extracted from the silicate phase and reacts with $CO_2$ to form solid carbonates). At least a portion of said carbonates are formed by reaction (direct carbonation) of the one or more alkaline earth metal silicate phases. The thus formed carbonates are hence advantageously alkaline earth metal carbonates.

Elevated temperature and pressure allow the formation of indicated amounts of carbonates, which are the main binding elements of the article. By mainly carbonate bonded article is meant in the present specification that the strength of the article is mainly due to the carbonates formed. This can be tested by subjecting an identical compact of granular material to a treatment step in a nitrogen atmosphere which does not contain $CO_2$, wherein other conditions are same as in the reacting step indicated above. The compressive strength of the carbonated article shall be more than a factor 2, preferably at least a factor 3 and possibly at least a factor 5 higher than the compressive strength of the compact treated with nitrogen (Tests performed after 28 days of aging subsequent to the reacting step, according to Belgian standard NBN B15-220).

Hence, other binding phases are advantageously not formed, or formed only in limited amounts in the mainly carbonate bonded article. Therefore, the granular material is advantageously so selected, that it comprises no, or at most an amount of material having hydraulic binding properties, such that no or at most 2.2% by weight of calcium silicate hydrate phases are formed in the article (or in the compact), with values of at most 1.7% by weight being preferred, values of at most 1.0% by weight being more preferred and values of at most 0.5% by weight being most preferred. Such calcium silicate hydrate content refers to the content after 28 days of aging (under conditions according to Belgian standard NBN B15-237, viz. stored for 28 days at 20±2° C. under water or in an atmosphere with ≥90% relative humidity) subsequent to carbonation and refers to the calcium silicate hydrate phases formed in the article (or in the compact) not including the calcium silicate hydrate phases which may possibly already have been present in the granular material. The article is hence preferably not a cement-based article.

A material having hydraulic binding properties can be a hydraulic binder or latent hydraulic binder or pozzolanic material.

A calcium silicate hydrate phase can refer to amorphous calcium silicate hydrates (e.g. $3CaO.2SiO_2.3H_2O$). It can refer to crystalline calcium silicate hydrates, such as tobermorite, as well.

Elevated temperature and pressure as indicated advantageously enhance the environmental quality of the carbonated article, in that the leachability of hazardous elements can be prevented or greatly reduced. Elevated pressure furthermore advantageously increases the $CO_2$ uptake by the compact.

A portion of the carbonates can also be formed by carbonation of free alkaline earth metal oxides and hydroxides which may be present in the granular material and which are much more reactive towards carbonation than silicates. In the method according to the present invention, the higher pressures and temperatures enable advantageously to produce carbonates also from less reactive silicates. The present inventors have found that due to the carbonation of these less reactive silicates, the compacts may be less porous whilst still enabling to form the required amount of carbonates.

Conditions as identified by the claims advantageously enable to form carbonates, which are distributed uniformly throughout the compact. The advantage of starting from less porous compacts is that stronger articles can be produced, at least if, as in methods according to the invention, a sufficient amount of carbonates can still be formed.

Preferably, in the reacting step at least 10% by weight of carbonates ($CO_3^{2-}$) are formed, more preferably at least 12.5% by weight, even more preferably at least 15% by weight, most preferably at least 20% by weight of the mainly carbonate bonded article.

Preferably, the partial $CO_2$ ($pCO_2$) pressure in said atmosphere is higher than or equal to 0.1 MPa, more preferably higher than 0.3 MPa and most preferably higher than or equal to 0.5 MPa. The indicated $pCO_2$ pressure is preferably at least temporarily attained during the reacting step (i.e. during at least a fraction of the duration of the reacting step) and more preferably at the beginning of the reacting step. The $CO_2$ (molar) content of said atmosphere is preferably higher than 20%, more preferably higher than 50%, even more preferably higher than 70% and most preferably higher than 90%.

Preferably, in the reacting step an amount of $CO_2$ of at least 37 g $CO_2$/kg dry matter of the compact, and at least 74 g $CO_2$/kg, at least 92.5 g $CO_2$/kg, at least 111 g $CO_2$/kg and at least 148 g $CO_2$/kg dry matter of the compact is made to react with the granular material with increasing preference. These amounts enable to achieve the above described carbonate contents of the final product.

Preferably, said atmosphere is at a pressure of at least 1 MPa, more preferably at least 1.5 MPa, preferably at least 2 MPa, even more preferably at least 3 MPa, most preferably at least 5 MPa. In addition, said pressure can be smaller than or equal to 30 MPa, preferably smaller than or equal to 20 MPa. Any one of the abovementioned lower limits of said pressure can be combined with any one of the abovementioned upper limits of said pressure to yield preferred ranges.

In the reacting step, the compact is preferably exposed to said pressure uniformly, such as by having the atmosphere in the surrounding of the compact at a uniform pressure. In combination with the elevated pressure, this enhances uniform penetration of $CO_2$ into the compact and the formation of substantially uniform ($CO_2$) pressure in the pores and hence the formation of carbonates uniformly throughout the compact.

Preferably, said atmosphere is at a temperature of at least 90° C., with values of higher than 100° C., at least 110° C., at least 120° C. and at least 130° C. being most preferred. The temperature should be smaller than the boiling temperature of water at said pressure.

The temperature of said atmosphere is preferably at least 10° C. below the boiling point of water at the pressure of said atmosphere, with temperatures of at least 20° C., at least 30° C. and at least 50° C. below said boiling point being particularly preferred. Consequently, in the core of the compacts and in case of exothermic reactions occurring, the boiling point of water is advantageously not reached.

Preferably, in the reacting step, the temperature of said atmosphere is cycled (alternated) such that, after heating up said atmosphere to the temperature as indicated, it is reduced by at least 10° C., preferably at least 20° C., and increased again by at least 10° C., preferably at least 20° C. at least once. Preferably, such cycle is carried out at least twice, more preferably at least three times. Temperature cycling can aid in expelling excess water, formed during carbonation, from the (saturated) pores of the compact, so as to make them accessible to $CO_2$ again and increase $CO_2$ uptake.

Preferably, said one or more alkaline earth metal silicate phases comprise crystalline silicates. At least a portion of said crystalline silicates are made to react with carbon dioxide. Preferably, the alkaline earth metal in said crystalline silicate reacts with $CO_2$ to form a carbonate of said alkaline earth metal.

Preferably, the compact has a porosity falling in the range between 18% and 37% by volume. Preferably, the porosity is smaller than 33% by volume and more preferably smaller than 30% by volume.

Preferably, the compacting step comprises compacting the granular material with a compaction pressure of at least 5 MPa, more preferably at least 10 MPa, most preferably at least 15 MPa. In addition, the compaction pressure is preferably smaller than or equal to 65 MPa, more preferably smaller than 40 MPa. The compaction pressures as indicated can reduce the porosity of the compacts to the values as identified and enable thus to achieve stronger carbonated articles since, even for small porosities, the pressures and temperatures applied in accordance with the present invention still enable to produce the amount of carbonates required to achieve a strong article.

Preferably, at the beginning of the reacting step, the moisture content of the compact is smaller than or equal to 0.8 times the moisture saturation content, with moisture contents smaller than or equal to 0.6 times the moisture saturation content being more preferred. The moisture saturation content refers to the moisture content when all the pores are filled with moisture (water).

Preferably, at the beginning of the reacting step, the moisture content of the compact falls between 90% and 20% of the moisture saturation content, more preferably between 80% and 20%, most preferably between 80% and 40% thereof.

Preferably, the granular material comprises a fine fraction. The fine fraction consists of all the particles of the granular material having a particle size 500 µm and thus for example consists of all the particles passing through a 500 µm sieve. The fine fraction comprises said alkaline earth metal silicate phase(s).

Advantageously, at least 10% by volume of the fine fraction has a particle size smaller than or equal to 50 µm, preferably smaller than or equal to 30 µm, more preferably smaller than or equal to 20 µm, most preferably smaller than or equal to 10 μm. Compared to larger particles, the fine fraction can have the advantage to be more reactive towards the carbon dioxide.

Advantageously, at least 60% by volume of the fine fraction has a particle size smaller than or equal to 200 μm, preferably smaller than or equal to 150 μm, more preferably smaller than or equal to 100 μm, most preferably smaller than or equal to 80 μm.

Preferably, the granular material comprises slag from metal production processes. The granular material more preferably comprises slag from ferrous metal production processes. The granular material can particularly comprise (or consist of) slag from steel production (referred to as steelmaking slag), more particularly slag from stainless steel production, especially from the production of nickel-chromium stainless steel. Alternatively, or in addition, the granular material comprises (or consists of) slag from production processes of a non-ferrous metal substance. The granular material can comprise slag from the production of zinc. The granular material can comprise slag from the production of copper. The granular material can comprise slag from the production of lead.

Preferably, the granular material comprises (or consists of) slag from the production of phosphorus.

Preferably, the granular material comprises (or consists of) ashes, in particular bottom ashes and (non-coal) fly ashes. Non-coal fly ashes refer to fly ashes not originating from coal combustion.

Preferably, the total amount of such slags and ashes in the granular material is at least 20% by weight, with a content of at least 40% by weight being more preferred and a content of at least 60% by weight being particularly preferred.

In order to reduce the competition between carbonate formation and CSH formation, the content of materials having hydraulic binding properties is preferably reduced. Preferably, the ground granulated blast furnace slag content in the granular material is less than or equal to 5% by weight, more preferably less than or equal to 2.5% by weight. Most preferably, the granular material does not comprise ground granulated blast furnace slag.

Preferably, the class-F fly ash content in the granular material is less than or equal to 5% by weight, more preferably less than or equal to 2.5% by weight. Most preferably, the granular material does not comprise class-F fly ash.

Preferably, the total content of Portland cement and Portland clinker in the granular material is less than or equal to 7% by weight, more preferably less than or equal to 5% by weight, even more preferably less than or equal to 2.5% by weight. Most preferably, the granular material does neither comprise Portland cement, nor Portland clinker.

Preferably, the total content of ground granulated blast furnace slag, class-F fly ash, Portland cement and Portland clinker in the granular material is less than or equal to 7% by weight, more preferably less than or equal to 5% by weight, even more preferably less than or equal to 2.5% by weight.

Preferably, in methods of the invention the compact of granular material has an intrinsic permeability of at least $5 \cdot 10^{-12}$ cm$^2$, more preferably at least $1 \cdot 10^{-11}$ cm$^2$, even more preferably at least $5 \cdot 10^{-11}$ cm$^2$, most preferably at least $1 \cdot 10^{-10}$ cm$^2$.

Preferably, the compact has an intrinsic permeability smaller than or equal to $5 \cdot 10^{-7}$ cm$^2$, more preferably smaller than or equal to $1 \cdot 10^{-8}$ cm$^2$ and most preferably smaller than or equal to $5 \cdot 10^{-9}$ cm$^2$.

By the combination of process conditions as indicated for the carbonation reactions, two beneficial effects can be achieved simultaneously by methods of the invention: maximizing the strength of the obtained (carbonated) articles and maximizing CO$_2$ sequestration.

According to a second aspect of the invention, there is provided a mainly carbonate bonded article, which is obtained by methods according to the invention. The article comprises at least one alkaline earth metal silicate phase and at least 5% by weight carbonates ($CO_3^{2-}$). Said carbonates are advantageously uniformly distributed throughout the article.

The article is mainly carbonate bonded. In the present specification this means that the compression strength of the article would be less than 50% of the actual compression strength when it would not be bonded by the carbonates. The grains within the article are thus mainly bonded to one another by means of carbonate phases. The carbonate phase(s) hence form(s) the main binding or linking matrix. Hence, other binding phases are advantageously not present, or present only in minor amounts. Therefore, the article advantageously comprises no or at most 2.2% by weight of calcium silicate hydrate phases, with values of at most 1.7% by weight being preferred, values of at most 1.0% by weight being more preferred and values of at most 0.5% by weight being most preferred. Such calcium silicate hydrate phases refer to phases present in the matrix linking grains or particles together. (Crystalline) calcium silicate hydrate phases which may optionally be comprised in the grains are not to be included.

Preferably, the total content of ground granulated blast furnace slag, class-F fly ash, Portland cement and Portland clinker in the mainly carbonate bonded article is less than or equal to 7% by weight, more preferably less than or equal to 5% by weight and even more preferably less than or equal to 2.5% by weight. The presence of these materials can be due to non-hydrated and/or non-carbonated fractions of such materials that were present in the granular material from which the article was made. Most preferably, said article does not comprise any of said materials.

Preferably, said alkaline earth metal silicate phase comprises depletion zones of lower alkaline earth metal cotnent which are in contact with a carbonate matrix.

Preferably, the article has a compressive strength of at least 15 MPa, more preferably at least 30 MPa, most preferably at least 45 MPa.

Preferably, the mainly carbonate bonded article has a porosity smaller than 27% by volume, preferably smaller than 22% by volume, and most preferably smaller than 17% by volume. As a result, the water absorption of said article can be advantageously lower than 15% by weight, more preferably lower than 12.5% by weight, even more preferably lower than 10% by weight, most preferably lower than 7.5% by weight.

Preferably, the pH of the mainly carbonate bonded article, after immersion in demineralised water for 18 hours in a liquid/solid ratio of 4.5 falls in the range between 8.3 and 11.5.

Preferably, the article comprises stainless steel slag. The Cr leaching from the article, measured according to DIN 38414-S4/EN 12457-4, is preferably less than 0.1 mg/l. The Mo leaching from the article, measured according to DIN 38414-S4/EN 12457-4, is preferably less than 0.15 mg/l.

Preferably, the article comprises municipal waste incinerator bottom ash. The Cu leaching from the article, measured according to DIN 38414-S4/EN 12457-4, is preferably less than 2 mg/l. The Mo leaching from the article, measured according to DIN 38414-S4/EN 12457-4, is preferably less than 0.15 mg/l.

Preferably, the article has a smallest dimension larger than or equal to 46 mm, more preferably larger than or equal to 100 mm, even more preferably larger than or equal to 215 mm.

BRIEF DESCRIPTION OF THE DRAWINGS

FIG. 1A represents the particle size distribution (particle size occurrence in % by volume) versus the particle size (μm) of three samples of stainless steel slag (R1, R2, R3). FIG. 1B represents the corresponding cumulative values (% by volume) versus the particle size (μm). FIG. 1C represents the particle size distribution (particle size occurrence in % by volume) versus the particle size (μm) of sea sand. FIG. 1D represents the corresponding cumulative values (% by volume) versus the particle size (μm).

FIG. 3 represents concentrations of Cr and Mo in solution (μg/l) after immersion of carbonated blocks (70 wt % SSt slag, 30 wt % sea sand) in a first solution for hours (D1) and a second solution for 18 hours (D2). Concentrations in the first and second solution were determined for blocks carbonated at 140° C. and at CO$_2$ pressures (pCO$_2$) identified on the graphs (1, 2, 5, 7.5, 10 and 14 MPa). Results of the same tests for non-carbonated compacts are indicated at 0 bar pCO$_2$.

FIG. 4 represents results of batch leaching tests (EN 12457-4) on comminuted carbonated blocks (70 wt % SSt slag, 30 wt % sea sand). Tests were performed on blocks carbonated for 18 hours at 140° C. and at CO$_2$ pressures (pCO$_2$) identified on the graphs (1, 2, 5, 7.5, 10 and 14 MPa). The blocks were subsequently crushed to particles with size smaller than 10 mm. Results of the same tests for non-carbonated compacts are indicated at 0 bar pCO$_2$.

FIG. 5A represents the particle size distribution (particle size occurrence in % by volume) versus particle size (μm). FIG. 5B represents the corresponding cumulative values versus particle size (μm).

FIG. 9A represents the sawed mid-plane of a carbonated block (140° C., 2 MPa, 18 hours) from a compact (182 kg/cm$^2$ compaction pressure and 12% moisture content) after impregnation with phenolphthalein, resulting in no colouring throughout the plane. FIG. 9B represents the sawed mid-plane of a corresponding non-carbonated compact after impregnation with phenolphthalein, resulting in uniform red-purple colouring throughout the plane.

DETAILED DESCRIPTION OF THE INVENTION

Figure 1:
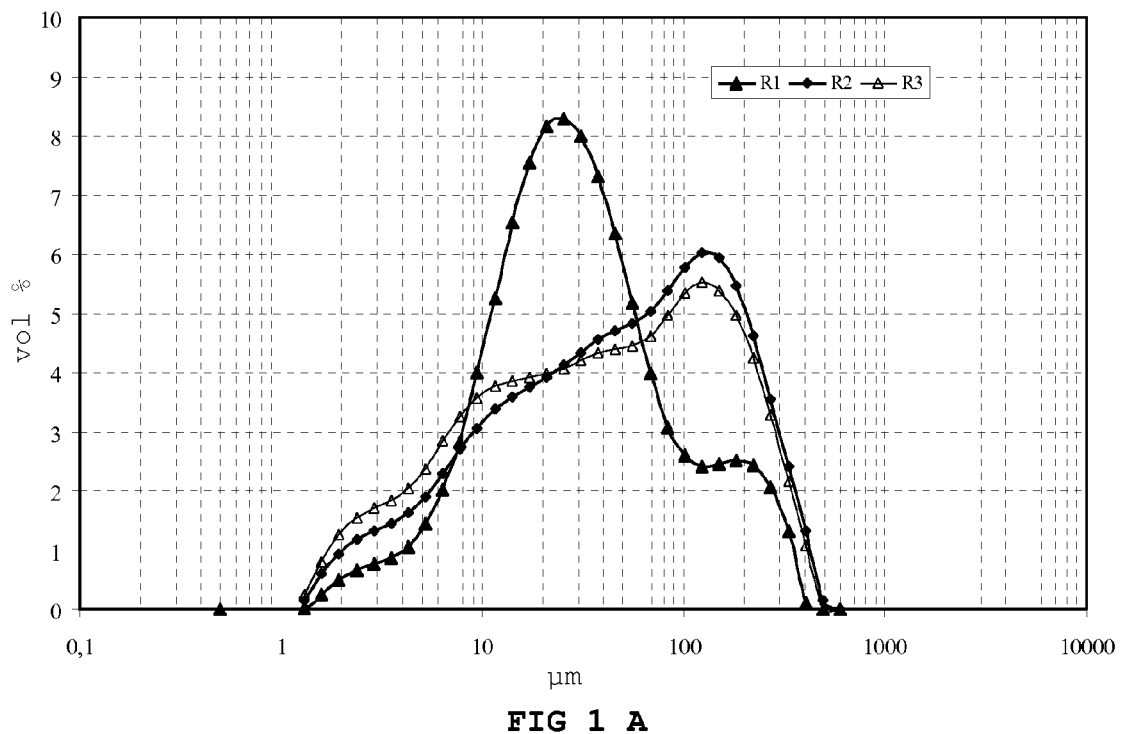
FIG. 1 represents the particle size distribution of stainless steel (SSt) slag (residual fraction after extraction of metal fraction) and of sea sand.
Figure 1:
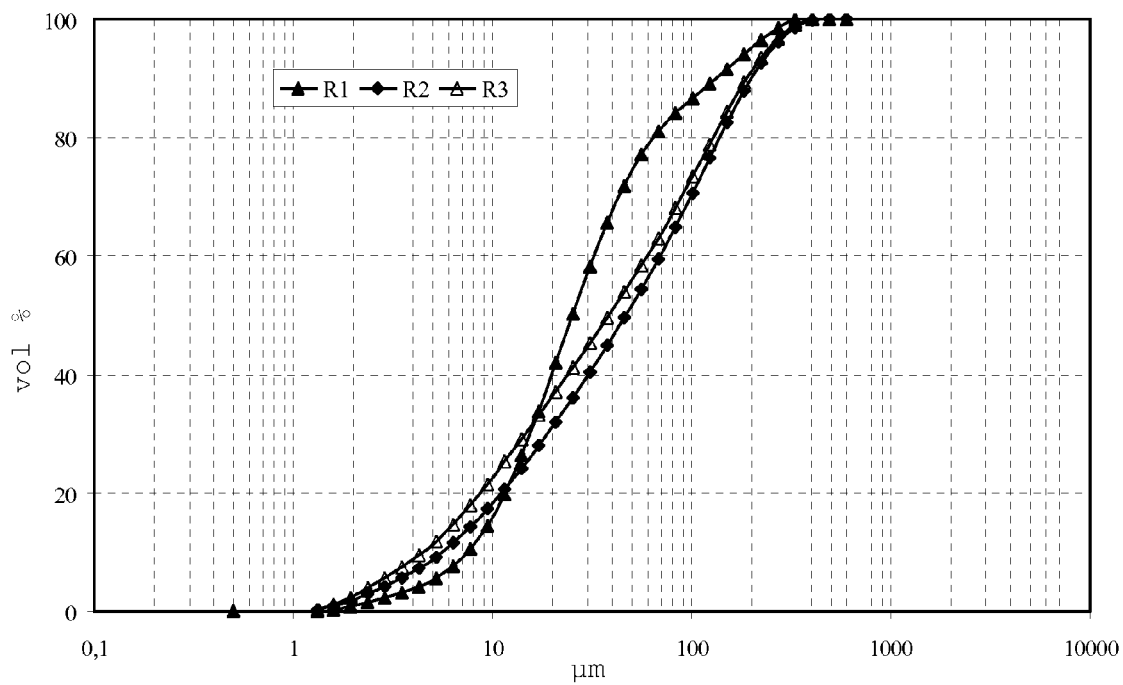
Figure 1:
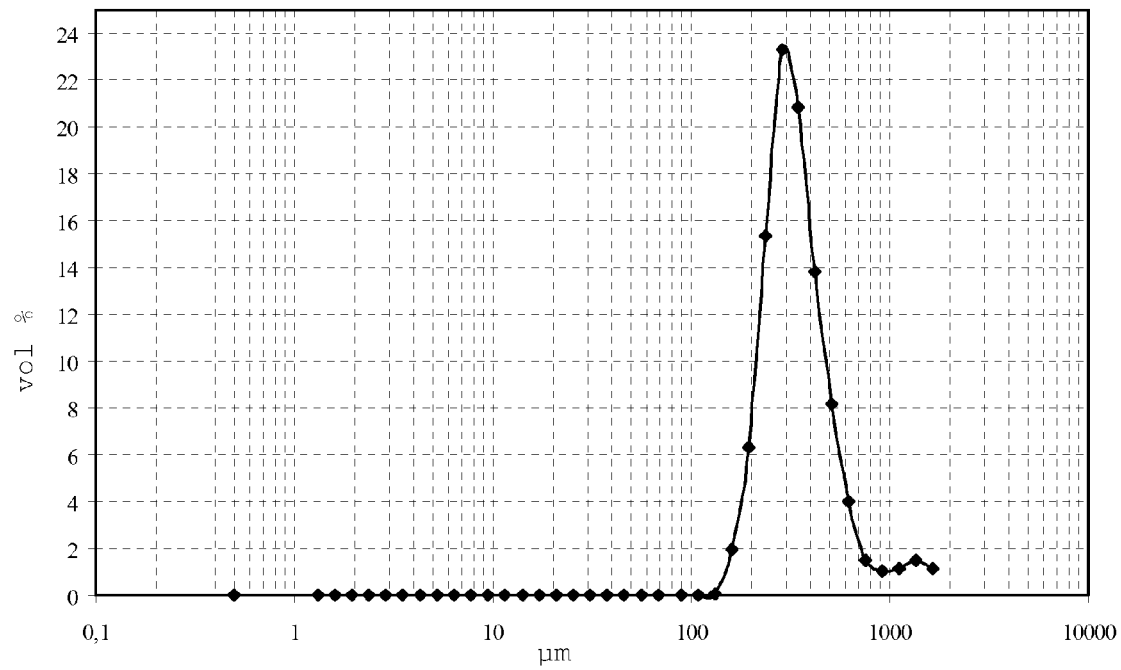
Figure 1:
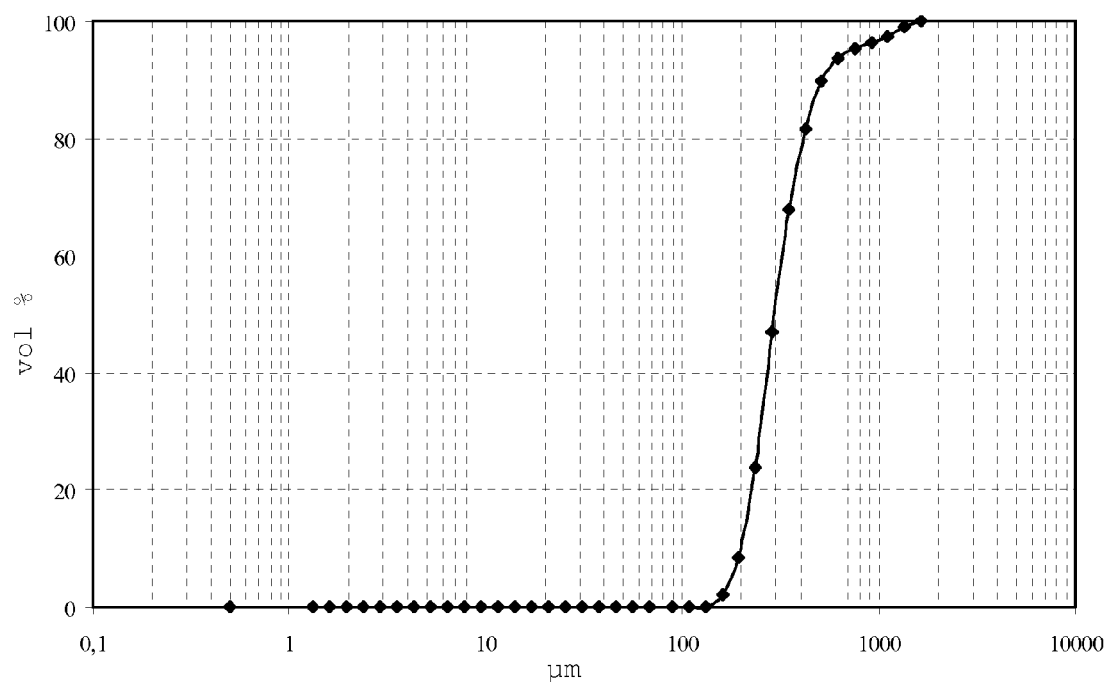

Embodiments of the present invention will now be described in detail with reference to the attached figures, the invention is not limited thereto but only by the claims. Those skilled in the art can recognize numerous variations and modifications of this invention that are encompassed by its scope. Accordingly, the description of preferred embodiments should not be deemed to limit the scope of the present invention.

Furthermore, the terms first, second and the like in the description and in the claims are used for distinguishing between similar elements and not necessarily for describing a sequential or chronological order. It is to be understood that the terms so used are interchangeable under appropriate circumstances and that embodiments of the invention described herein are capable of operation in other sequences than described or illustrated herein.

It is to be noticed that the term "comprising" should not be interpreted as being restricted to the means listed thereafter; it does not exclude other elements or steps. Thus, the scope of the expression "a device comprising means A and B" should not be limited to devices consisting only of components A and B. It means that with respect to the present invention, A and B are relevant components of the device.

Where numerical values are given with regard to limitations of a quantity, or the outcome of a measurement, for the assessment of those values, account shall be taken of variations due to impurities, methods used to determine measurements, human error, statistical variance, etc.

Where a range of numerical values is defined as extending between a lower limit and an upper limit, the range is to be construed as including said lower limit and said upper limit, unless otherwise noted.

According to an aspect of the invention, methods are provided for producing an article (such as e.g. an artificial stone) by carbonation, resulting in a mainly carbonate bonded article. The carbonation process refers to artificial or accelerated carbonation, wherein the carbonation reactions take place in a controlled environment, under controlled parameters.

In methods according to the invention, a granular material is made to react with carbon dioxide in an ambient in the presence of water, at a temperature and a pressure which will be identified, to cause the formation of carbonates. The carbonates link the granules or particles together in a network, resulting in the formation of a cohering compound, referred to as a (carbonated) article. Methods of the invention enable to form carbonates at the contact points between particles, which increases the strength of the carbonated skeleton.

The granular material is provided with a chemical and physical composition and is subjected, prior to the reaction, to a pre-treatment, as will be identified. The pre-treatment comprises a compaction of the granular material to obtain a compact. A combination of composition of granular material and compaction conditions enables, according to the invention, to obtain a compact having a low porosity, but nevertheless a sufficient permeability as will be indicated. This allows to obtain a uniform carbonation even into the core of such articles and advantageously to increase the strength of the carbonated articles. In the reacting step, the moisture content of the compact is such that still an open porosity exists, enabling an almost instantaneous diffusion of carbon dioxide through the compact.

The different method steps of the invention lead to the formation of a solid, cohering product (a carbonated article), wherein the main binding phase(s) is(are) constituted by carbonates that are formed during the reacting step. The particles of the granular material get mainly bonded to one another by means of the carbonate phases formed. These carbonate phase(s) contribute for more than 50% in the final compressive strength of the article. This means that the final compressive strength of the carbonated article is more than a factor 2, preferably at least a factor 3 and more preferably at least a factor 5 higher than the final compressive strength of a compact after treatment according to methods of the invention, but with nitrogen gas instead of a $CO_2$ containing gas. The article is therefore referred to as a mainly carbonate bonded article.

The article can advantageously show a uniform distribution of carbonates and possibly a high compressive strength. It can be environment-friendly. Potentially hazardous waste materials, such as ashes and slags including heavy metals, can be used in the granular material, as the method of the invention allows to immobilise those waste materials in said articles. As a result, leaching of hazardous inclusions from the carbonated articles of the invention can be minimized to values in conformity with national or regional regulations.

Steps of methods according to the invention will now be set out. It is to be noted that although method steps are discussed in a defined order of appearance and are identified with sequence terms as first, second, following, etc., such order need not be so and the order in which at least some of the method steps can be carried out can be altered.

Hence, in a first step of methods of the invention, a granular material is provided. The granular material can be a powder or can comprise a powder.

The granular material can be obtained by mixing two or more different granular materials (with different granulometries, hence achieving a bimodal or multimodal particle size distribution). The granular material can be obtained by milling, crushing and/or grinding a bulk material. The granular material can also consist of either a fine fraction or a coarse fraction, such as obtained after sieving.

In an optional second step, the moisture content of the granular material can be adapted to fall within values that will be identified.

A third step comprises compacting the granular material to obtain a compact.

According to an aspect of the invention, the compacting step is so arranged that, in combination with a selection of granulometry and possibly of mixture of the granular material, a compact is obtained having a porosity and an intrinsic permeability as will be indicated. The granulometry/mixture of the granular material and the arrangement of the compacting step determine the porosity and the intrinsic permeability of the compact. The porosity and the permeability are so chosen as to enable to achieve a good strength (porosity sufficiently low) and an optimal convection and diffusion of $CO_2$ through the compact (intrinsic permeability sufficiently high). This allows to form carbonates substantially uniformly throughout the compact, which will enhance the strength of the end product (carbonate bonded article). Furthermore, improved physico-chemical properties of the carbonated article can thereby be obtained as well.

The porosity of the compacts is smaller than or equal to 37% by volume and preferably larger than or equal to 18% by volume, with values falling in the range between 18% and 33% being preferred and values falling in the range between 18% and 30% being particularly preferred. The indicated ranges of porosity refer to the porosity as determined by mercury intrusion (Hg-porosimetry).

An intrinsic permeability k of a compact refers to its ability to transmit fluids. It can be measured with a capillary flow porometer, such as e.g. type CFP-1200-A from Porous Materials Inc., USA. The fluid used is preferably gaseous nitrogen.

The intrinsic permeability k of the compacts should be at least $1 \cdot 10^{-12}$ cm$^2$, with a value of at least $5 \cdot 10^{-12}$ cm$^2$ being preferred, a value of at least $1 \cdot 10^{-11}$ cm$^2$ being more preferred, a value of at least $5 \cdot 10^{-11}$ cm$^2$ being even more preferred and a value of at least $1 \cdot 10^{-10}$ cm$^2$ being particularly preferred.

Preferably, the compacts have an intrinsic permeability smaller than $5 \cdot 10^{-7}$ cm$^2$, preferably smaller than $1 \cdot 10^{-8}$ cm$^2$ and more preferably smaller than $5 \cdot 10^{-9}$ cm$^2$.

Indicated values of porosity and intrinsic permeability of the compacts of granular material can be obtained following procedures specified below.

The packing density of a granular material represents the volume fraction of a container of unit volume occupied by solids. Representing the actual volume occupied by the solid by v and the specific volume of the solid (weight divided by specific density) by $v_o$ then the packing density can be expressed as $\Phi = v_o/v$. The porosity is then defined as $1-\Phi$. For a granular material having a given granulometry, the packing density can be determined, for example by calculation as proposed by Vukovic and Soro in "Determination of hydraulic conductivity of porous media from grain-size distribution", Water Resources Publications, LLC, Colorado, 1992. Therein, an empirical relationship between the porosity and a grain size uniformity coefficient is disclosed. Defining $D_{10}$ and $D_{60}$ as the grain size at respectively 10% and 60% (by volume) cumulative passing, then the grain size uniformity coefficient is defined as $U = D_{60}/D_{10}$. According to Vukovic and Soro, the porosity can be estimated based on the empirical relation: $n = 0.255(1+0.83^U)$, with U the grain size uniformity coefficient as identified above and n the porosity expressed in fractional values. It is noted that volumetric particle size distributions can be measured by laser diffractometry. Furthermore, the intrinsic permeability k of a granular material can be estimated based on the Kozeny-Carman equation:

$$k = 8.3 \cdot 10^{-3} \frac{n^3}{(1-n)^2} D_{10}^2$$

wherein n and $D_{10}$ are as indicated above.

Starting form a desired porosity and intrinsic permeability, the above relations hence allow to find a required granulometry of granular material and possibly determine the required compaction. The procedure specified above works with unimodal particle size distributions, such as from a single granular material.

In some cases, the use of a single granular material is not desired, or does not enable to obtain the indicated properties. In such cases, granular materials having different granulometry can be added to form a mixture. These can be different materials, but also the same material with different granulometry, or a combination of both.

In case the granular material is composed of a mixture of granular materials, each having their own granulometry, the following procedure can be followed for finding a mix corresponding to desired values of porosity and intrinsic permeability. In such case, a packing density diagram can be determined for all possible combinations of composing materials. This can be done using dedicated software, such as from G.M. Idorn Consult A/S, Denmark and is illustrated in what follows.

Figure 10:
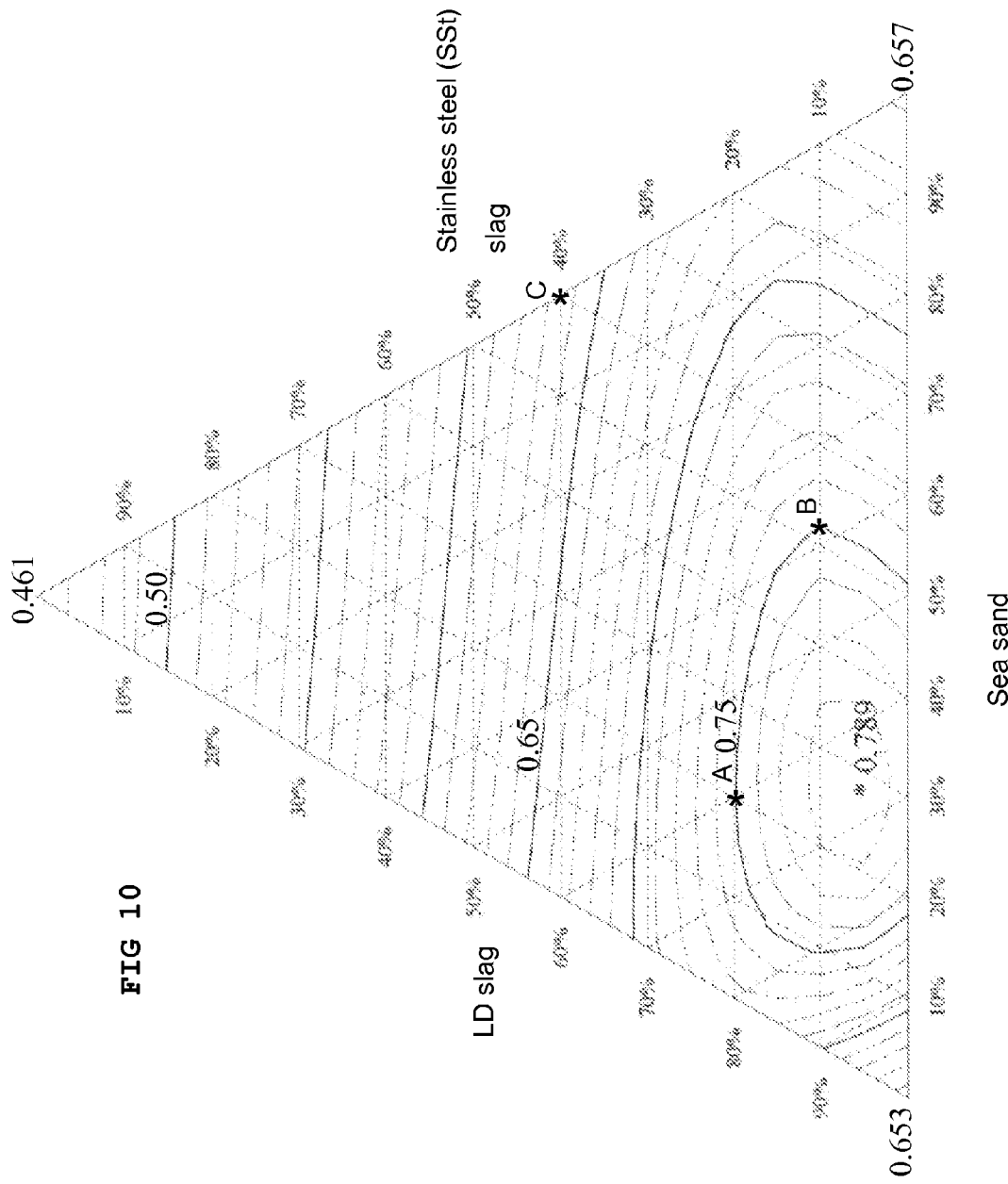
FIG. 10 represents a ternary packing diagram for Sea sand, LD slag and stainless steel slag. Sea sand has particle size ranging 0-1 mm with characteristic diameter 0.53 mm, density of 2611 kg/m$^3$ and packing density of the pure component after compaction by vibration until settlement of 0.657. LD slag has particle size ranging 2-8 mm with characteristic diameter 5.75 mm, density of 2990 kg/m$^3$ and packing density of the pure component after compaction by vibration until settlement of 0.653. Stainless steel slag has particle size ranging 0-0.5 mm with characteristic diameter 0.13 mm, density of 2990 kg/m$^3$ and packing density of the pure component after compaction by vibration until settlement of 0.461. Calculations performed by Europack (proprietary software of G.M. Idorn Consult A/S, Denmark). Characteristic diameter D* is obtained by the Rosin-Rammler distribution of the particle size: $R(D)=1-F(D)=e-(D/D^*)^n$ where F(D) is the cumulative probability that the particle diameter is less than D.

FIG. 10 shows a ternary packing density diagram for stainless steel slag with particle size 0-0.5 mm, LD slag with particle size 2-8 mm and sea sand with particle size 0-1 mm. The indicated packing density in FIG. 10 is one obtained after compaction, in this case vibrating until no further settlement is observed. Altering the method and/or parameters of compaction will affect the absolute values of packing density, but not the relative differences thereof between different mixtures on the graph (i.e. the shape of the diagram as in FIG. 10 will not be altered, only the isodensity lines will correspond to other packing densities). For mixtures of the same constituent materials in different amounts, the packing density can hence easily be found.

Upon selection of a mixture for the granular material, with resulting overall granulometry, and leading to a given packing density and hence a porosity, the intrinsic permeability can be derived by calculation (based on the Kozeny-Carman equation), or experimentally.

The above procedure is illustrated by way of the following example and referring to FIG. 10. A granular material composed of 100% SSt slag will have a packing density of about 0.46, corresponding to a porosity of 54%, which is too high. In order to decrease the porosity, either the compaction method can be changed, e.g. by pressing the granular material, or a second and/or third granular material having different granulometry can be admixed. The ternary diagram of FIG. 10 can help to find a suitable mixture. By way of example, mixing 40% wt. SSt slag with 60% wt. sea sand forms a mixture having a porosity of 36.5% (point C on FIG. 10). The instrinsic permeability of such a mixture is about $2 \cdot 10^{-9}$ cm$^2$ based on the Kozeny-Carman equation.

As to the intrinsic permeability, one may adjust the mixture composition, such that it continues to lie on the same isodensity line (keeping the porosity constant), while the intrinsic permeability is affected. For example, points A and B on FIG. 10 both lie on the 0.75 isodensity line, meaning that for both mixtures a compact having a porosity of 25% can be obtained. Mixture A corresponds to 20% sea sand, 20% SSt slag and 60% LD slag (weight %). Mixture B corresponds to 52% sea sand, 10% SSt slag and 38% LD slag. The intrinsic permeability of a compact made from mixture B has an intrinsic permeability k of about $5 \cdot 10^{-8}$ cm$^2$, being about 25 times higher than the intrinsic permeability k of about $2 \cdot 10^{-9}$ cm$^2$ of a compact made from mixture A (calculations based on Kozeny-Carman equation and the particle size distributions of FIG. 1). Whereas the Kozeny-Carman equation allows an estimation of the intrinsic permeability, more precise values can be experimentally determined.

The overall granulometry of the granular material can be adapted, should the intrinsic permeability turn out not to be as desired, e.g. by changing the mixture. This can be done in a way that affects the intrinsic permeability, but not or only slightly the packing density, e.g. by selecting another point on the same isodensity line.

In the following, the interrelation between granulometry and mixture on the one hand, and porosity and intrinsic permeability is further assessed.

A fine fraction of the granular material is advantageously defined as that fraction of the granular material consisting of the particles (grains, granules) having a particle size smaller than or equal to 500 μm. The granular material can be obtained by mixing the fine fraction with a coarser fraction, which is typically less reactive to $CO_2$. Said fine fraction preferably amounts to at least 50% by weight, more preferably at least 65% by weight and most preferably at least 80% by weight of the granular material. The granular material can consist of the fine fraction.

The particle size distribution of the granular material, or of at least the fine fraction as indicated above, hence affects the porosity and permeability of the compacts.

Preferably in said fine fraction (or in said granular material), the grain size uniformity coefficient U is larger than or equal to 4.3, which can correspond to a porosity of the compacted granular material smaller than or equal to about 37%.

Preferably, the $D_{10}$ grain size of the fine fraction (or of the granular material if the granular material consists of only a fine fraction as identified) is smaller than or equal to 50 μm, more preferably smaller than or equal to 30 μm, even more preferably smaller than or equal to 20 μm and most preferably smaller than or equal to 10 μm. Particularly preferable is a $D_{10}$ grain size of the fine fraction (or of the granular material if the granular material consists of only a fine fraction as identified) falling in the range between 0.5 μm and 10 μm.

The $D_{60}$ grain size of the fine fraction (or of the granular material if the granular material consists of only a fine fraction as identified) is preferably smaller than or equal to 250 μm, more preferably smaller than or equal to 150 μm, even more preferably smaller than or equal to 100 μm and most preferably smaller than or equal to 80 μm. Particularly advantageous is a $D_{60}$ grain size of the fine fraction (or of the granular material if the granular material consists of only a fine fraction as identified) falling in the range between 50 μm and 200 μm.

As concerns the intrinsic permeability k, it is generally observed (see e.g. the Kozeny-Carman relation) that both the grain size and the porosity affect the intrinsic permeability. A finer grain size and a lower porosity reduce the intrinsic permeability. However, it is also observed that the grain size affects the intrinsic permeability to a larger extent than the porosity.

This means that for a finer granular material (smaller $D_{10}$ grain size), the porosity of the compacts can be selected to be higher than for coarser granular materials, in order to obtain same values of intrinsic permeability for compacts of the two materials.

By way of example, referring still to FIG. 10, the two mixtures of granular material corresponding to points A ($D_{10}$=30 μm) and C ($D_{10}$=13 μm), lead to compacts having same intrinsic permeability (calculated value k of about $2 \cdot 10^{-9}$ cm$^2$), whereas the porosity will be different (25% for A and 36.5% for C).

Notwithstanding such higher porosity, the high strengths as indicated for the carbonated articles can still be achieved for said finer granular materials. This is because the fine particles have a larger surface area for the carbonation reactions so that more carbonates can be formed, especially when these carbonates have to be formed starting from less reactive alkaline earth metal silicates.

However, according to the invention, higher compressive strengths of the carbonated articles can even be achieved with smaller intrinsic permeabilities. Hence, the granulometry of the granular material is preferably so selected that, after compaction, the compacts have an intrinsic permeability smaller than $5 \cdot 10^{-7}$ cm$^2$, more preferably smaller than $1 \cdot 10^{-8}$ cm$^2$ and most preferably smaller than $5 \cdot 10^{-9}$ cm$^2$. According to the invention it has hence been found, that even when using a fine granular material (e.g. having a $D_{10}$ grain size of less than 10 μm), and even when compacting this granular material under a relatively high pressure so that a stronger article can be produced (also due to a lower porosity), the high pressures and temperatures applied in the method according to the invention enable to carbonate the compact sufficiently to achieve, notwithstanding the relatively small permeability of the compact, a strong article.

Such smaller intrinsic permeabilities enable the use of relatively fine granular materials, the coarser of which can be selected to have a low porosity (in order to obtain a high compressive strength), whilst the finer can be selected to have a higher porosity (but have a larger surface area thus providing more reactive sites for linking the particles together thereby obtaining a high compressive strength as well).

It has been observed by the inventors that for compacts of large volume, the indicated values of intrinsic permeability enable methods of the invention to carbonate even in the cores thereof. Hence, the size of the compact need not be relevant for methods of the invention.

The porosity and permeability can also influence the mechanical stresses that can appear during the carbonation reaction(s), as the formation of carbonates is associated with a volume increase.

The compaction of the granular material affects the porosity and intrinsic permeability of the compacts. A compaction of the granular material can influence the packing of the grains. Different compaction methods can be applied, such as by pressing, by tapping by vibration, or by ultrasonic shaking, wherein compaction by pressing and/or tapping is preferred. The compaction of the granular material can be performed together with a shaping (casting) step, wherein the granular material is shaped to a predetermined form and predetermined dimensions.

For shaping, the granular material is preferably put in a mould. The granular material can be compacted in the mould to obtain a compact. Thereafter, the compact can be released from the mould.

The compacts preferably possess sufficient strength to enable handling of the compact (e.g. for transporting to a reactor for carbonation according to the invention).

In case the compaction method is by pressing, a compaction pressure falling in the range between 5 MPa and 65 MPa is preferably applied. More preferably, the compaction pressure falls in the range between 10 MPa and 65 MPa, even more preferably in the range between 15 MPa and 65 MPa.

The compaction step can induce cracks/new reactive surfaces on the grain boundaries, due to very high contact pressures between the grains. This can stimulate the carbonation reactions by activating some reactive phases.

Compaction (or packing) and granulometry can be tuned in order to obtain the porosity and permeability values for the compacts as indicated. For the granulometry, the particle shape and the particle size distribution can be important.

Water can be present in the granular material in the form of moisture or in the form of hydrates.

Moisture refers to water present in the (compacts of) granular material, and in particular in the pores thereof. Moisture is not or weakly bound to substances of the granular material. Moisture can be determined as the water evaporated at a temperature of 105° C. and atmospheric pressure. Moisture (water) is needed for the carbonation reaction to occur and advantageously to proceed at a satisfactory rate. The moisture can form a water film around reactive phases, which enhances the carbonation reactions, as the formation of carbonates occurs in a hydrous phase. Furthermore, moisturized granular material is easier to shape to a predetermined form. The moisture can be adsorbed on the grains, or be present in the pores.

Hydrates comprise water which hydrates the free (reactive) oxides present in the granular material, such as the free oxides of alkaline earth metals, and CaO and MgO in particular, so as to form hydroxides (e.g. $Ca(OH)_2$ and $Mg(OH)_2$). Hydration water hence forms stronger bindings and is typically freed (evaporated) at temperatures in excess of 105° C. (e.g. about 486° C. and 387° C. for respectively $Ca(OH)_2$ and $Mg(OH)_2$).

Not all free oxides can in general be hydrated at atmospheric conditions. In case the granular material is not fully hydrated (not all free oxides (CaO and MgO) are hydrated), part of the moisture serves during carbonation to hydrate those oxides that are not hydrated yet and that participate in the carbonation reactions. Preferably, the granular material is hydrated to a large extent prior to carbonation. Methods of the invention can comprise a pre-treatment to hydrate free oxides comprised in the granular material. The moisture content of the granular material is advantageously selected in function of the amount of hydration.

When too little moisture is present, carbonation reactions may take place under less optimal conditions. Hence, a minimal amount of 2% by weight should preferably be present during the reaction.

On the other hand, too high moisture contents can severely limit the $CO_2$ diffusivity and reactivity. The pores of the compacts therefore may not be saturated with water at the beginning of the reacting step. Indeed, the inflow of $CO_2$ in the pores is counteracted by the outflow of water (e.g. water produced during carbonation, or moisture present in the pores). Hence, for carbonation, the pores of the compacts should not be saturated with moisture. In other words, the pore volume should be larger than the volume of the moisture contained in the compact. Hence, the moisture content of the compact should preferably be smaller than the moisture saturation content x, wherein x (expressed in % by total solid and liquid weight) can be calculated by the formula:

$$x = 100 * \frac{1}{1 + \frac{\rho}{1000 * po}}$$

wherein $\rho$ represents the overall density (kg dry weight/m$^3$) of the compacted granular material and po represents the porosity (fraction by volume). By way of example, for a porosity po=0.37 (37% by volume) and a density $\rho$=1500 kg/m$^3$, the moisture content should preferably be smaller than 19.8% by weight. Preferably, the moisture content at the beginning of the reaction is smaller than or equal to 0.8x, more preferably smaller than or equal to 0.6x.

The indicated moisture content of the granular material can be obtained according to several alternative embodiments. Firstly, if the granular material is too dry, it can be moisturized by the addition of water, such as spraying, passing water vapour through the granular material, etc. In case the granular material is poorly hydrated, part of the water added can hydrate free oxides. That part of the added water hence will not be present as moisture. Secondly, if the moisture content of the granular material is at saturated levels, the granular material can be dried according to methods known in the art. Thirdly, the moisture can already be comprised in the granular material in an amount corresponding to the content as identified.

Compacting of the granular material can be used to expel excess moisture. After compaction, when the pores regain their elastically deformed volume, they are not saturated anymore with moisture.

According to a still alternative embodiment, moisture can be added during the carbonation reaction, such as by providing a gas comprising (or saturated with) water vapour or by providing water in liquid phase in the reaction chamber which will evaporate. To enhance the evaporation of this water, it may be heated locally (heating of the compact so that the water present therein starts boiling is to be avoided) or the gas fed into the reaction chamber can be guided (bubbled) through this water. The addition of a gas comprising water vapour during the carbonation process can be performed in addition to the step of adapting the moisture content of the granular material.

Preferably, the reaction chamber is not heated by introducing dry (superheated) steam therein. Preferably, wet steam is not introduced in the reaction chamber for heating the chamber.

In the method according to the invention, the granular material (powder) is, however, not suspended in an aqueous solution during carbonation reaction.

The granular material should contain phases which are sufficiently reactive for the carbonation process. The reactivity of the granular material, under the conditions as specified, should enable to form at least 5% by weight of $CO_3^{2-}$ (additional to those that can already be present in the green—prior to compaction and carbonation—granular material). Preferably, the carbonates ($CO_3^{2-}$), formed by a method of the invention, amount to at least 10% by weight, with amounts of at least 15% being more preferred, amounts of at least 20% being even more preferred and amounts of at least 25% being particularly preferred.

The amount of formed carbonates ($CO_3^{2-}$) is usually smaller than 45% by weight.

In the present specification, the expression % by weight refers to % by dry weight and thus relates to the dry compositions. A dry composition can be obtained after evaporating moisture at 105° C.

The granular material hence is a solid, preferably inorganic material. It is alkaline. The term alkaline refers to a material having in particular a pH 8.3. The pH of the granular material is preferably larger than or equal to 9.5, with a pH≥11.5 being more preferred and a pH≥12.5 for the granular material being most preferred. Said pH refers to the pH of water in contact with the granular material. As explained hereabove, the granular material may be a mixture of granular materials which have different pH values. In this case, the pH of the mixture should meet the above described pH requirements.

The granular material comprises sources of alkaline earth metals that can react with carbon dioxide to form carbonates of said metals. Those sources comprise alkaline earth metal silicate phases. The chemical speciation of said alkaline earth metals in the granular material is such that reaction of said metals with $CO_2$ to form carbonates under the conditions specified by the invention is possible. Calcium and magnesium are preferred alkaline earth metals, with calcium being most preferred.

Methods of the invention comprise a reacting step in which the compact is brought in contact with an atmosphere comprising (or consisting essentially of) carbon dioxide to allow for carbonation reactions to occur. The reactions preferably take place in a reactor. The carbon dioxide should be available in a sufficient amount to allow to form the amount of carbonates as indicated.

The reactions can take place in a closed reactor (an autoclave), to which a fluid, comprising a predetermined amount of carbon dioxide, is supplied which is at least sufficient for forming the amounts of carbonates as indicated. The reaction can alternatively take place in a flow reactor, wherein a continuous flow of a fluid through the reactor (along or through the compacts) is provided.

The fluid (the atmosphere) can be a gas. In all cases, the fluid can comprise water (or water vapour). The fluid can be an exhaust gas of an industrial plant; it can be flue gas.

Carbon dioxide is preferably not supplied to the reactor in a supercritical state. During the reaction, the carbon dioxide is preferably not in a supercritical state.

The inventors found that it is advantageous to carry out the carbonation reaction(s) at elevated temperature and pressure conditions as identified. The elevated temperature and/or pressure enable an increased carbonation rate and an increased amount of carbonates to be formed. The elevated temperature and/or pressure also allow to enhance the formation of carbonates at the contacts between the grains. In addition, a number of carbonation reactions are found to occur, which would otherwise not occur at low temperature and/or low pressure. This results in stronger end materials (products), especially when the compact has a reduced porosity after compaction as described hereinabove. Moreover, by adapting the temperature and/or pressure as identified, expansive cracking can be avoided and a uniform carbonation of the artificial stones can be accomplished. This guarantees high compressive strengths, low leaching of hazardous elements, a high $CO_2$ sequestration, or a combination thereof.

The reacting step is advantageously carried out in an ambient (e.g. the atmosphere of a reactor surrounding the compact), of which the temperature is at least 70° C., the temperature being with increasing preference at least 90° C., higher than 100° C., at least 110° C., at least 120° C. and at least 130° C. The temperature should not exceed the boiling point of water at the reaction pressure. This could otherwise lead to cracks in the carbonated article.

The reacting step is carried out in an ambient (e.g. the atmosphere of a reactor), of which the pressure is at least 0.5 MPa, preferably at least 1 MPa, preferably at least 1.5 MPa, more preferably at least 2 MPa, even more preferably at least 3 MPa and most preferably at least 5 MPa. The pressure is preferably smaller than or equal to 30 MPa, more preferably smaller than or equal to 20 MPa. Said pressure refers to the total differential pressure of the ambient fluid.

As an additional condition, according to the invention, the pressure in said ambient should also be higher than the saturated vapour pressure of water at the reaction temperature (temperature of said ambient). The latter condition on pressure is equivalent to the boiling point condition of the temperature. A too quick evaporation (steam formation) of the moisture present in the pores can lead to crack formation. Conversely, when pressure remains above the saturated vapour pressure (or equivalently the temperature remains below the boiling point), excess moisture and/or water produced during carbonation will be mainly expelled in a liquid state, without abrupt volume changes. The present condition is particularly important in the initial stages of the reacting step, when the compact has not yet gained sufficient strength. The condition is however preferably met for the entire duration of the reacting step, in particular also during cooling down and depressurizing the carbonated compact (i.e. the article). Hence, preferably, after carbonation at the indicated temperature and pressure, the article (carbonated compact) is cooled down and depressurized (e.g. to ambient conditions, or to conditions enabling removal of the article from the reactor), wherein temperature and pressure evolve such that the pressure remains above the saturated vapour pressure of water at the (instantaneous) temperature of the article.

In obeying the latter condition on the relation between pressure and temperature during the reacting step, due account shall be taken of possible temperature increase within the compact due to exothermic carbonation reactions. The pressure in said ambient is hence preferably higher than the saturated vapour pressure of water at the temperature within the compact during the reaction in order to avoid boiling of water (moisture) within the compact.

In order to account for exothermic reactions possibly taking place, the temperature of said ambient is preferably at least 10° C. below the boiling point of water at the pressure of said ambient, with temperatures of at least 20° C., at least 30° C. and at least 50° C. below said boiling point being particularly preferred, so that in the core of the compacts and due to the exothermic carbonation reactions occurring, the boiling point of water is advantageously not reached so that no steam is formed within the compact.

Preferably, the temperature is cycled during the reacting step, i.e. it is alternated between a lower temperature and a higher temperature, both being less than the boiling point. Temperature cycling can be used to expel water when the pores get saturated with water in order to make them unsaturated and accessible to $CO_2$ again. This is based on differential thermal expansion between water and the granular material. As a result, the uptake of $CO_2$ can be increased, leading to stronger carbonated articles. The difference between said lower temperature and said higher temperature is at least 10° C., preferably at least 20° C., more preferably at least 40° C. At least one, preferably at least two, most preferably at least three cycles are carried out in the reacting step. A single cycle refers to, starting from the higher temperature, reducing the temperature to the lower temperature and increasing it again to said (or a different) higher temperature. Preferably, the atmosphere is maintained at said higher temperature(s) for at least 10 minutes, more preferably at least 20 minutes.

According to a preferred embodiment of the reacting step, the amount of $CO_2$ in said ambient (atmosphere) is such that the partial $CO_2$ pressure in said ambient is at least 0.1 MPa. Preferably, the partial $CO_2$ pressure is higher than 0.3 MPa and more preferably at least 0.5 MPa. Even more preferably, the partial $CO_2$ pressure is at least 1 MPa. The partial $CO_2$ pressure can be (substantially) equal to the total pressure (i.e. the gas consists essentially of carbon dioxide).

The atmosphere has preferably a carbon dioxide (molar) content higher than 20%, more preferably higher than 50%, even more preferably higher than 70% and most preferably higher than 90%.

The indicated values for the partial $CO_2$ pressure and for the carbon dioxide content are preferably at least temporarily attained during the reacting step, such as during at least 30 minutes, preferably at least 1 hour, more preferably at least 2 hours. More preferably, the values as indicated are at least attained at the beginning of the reacting step. A high carbon dioxide content is advantageous due to the fact that as the carbon dioxide is consumed, it is immediately replenished in the pores by new carbon dioxide entering the pores.

Preferably, the amount of $CO_2$ which is allowed to react with the granular material in the reacting step is at least 37 g $CO_2$/kg dry matter of the compact, and with increasing preference at least 74 g $CO_2$/kg dry matter of the compact, at least 92.5 g $CO_2$/kg dry matter of the compact, at least 111 g $CO_2$/kg dry matter of the compact and at least 148 g $CO_2$/kg dry matter of the compact. Such amounts advantageously allow to form the indicated amounts of carbonates.

Each of the ranges of one of the parameters of temperature, total pressure, partial $CO_2$ pressure and $CO_2$ content in the reacting step can be combined with all ranges of the other parameters to provide improved carbonation conditions.

The reaction time (e.g. residence time of the compacts in the reactor at operating temperature and pressure conditions as indicated) is preferably longer than 30 minutes, more preferably longer than or equal to 1 hour and most preferably longer than or equal to 2 hours. The reaction time is advantageously shorter than or equal to 48 hours, preferably shorter than 24 hours. The application of elevated temperature and pressure as indicated allows to considerably shorten the reaction times compared to methods of the prior art. This is an important economical advantage of the method of the invention.

The reaction of the granular material and the atmosphere leads to the formation of carbonates of the one or more alkaline earth metals. Carbonates of other metals present in the granular material can be formed as well.

Composition of the Granular Material

The granular material comprises (or consists essentially of) silicates of one or more alkaline earth metals, preferably Ca and/or Mg. Said silicates can refer to crystalline silicates and/or amorphous silicate phases. The silicates can be hydrated silicates. Preferably, the granular material comprises (or consists essentially of) crystalline and amorphous silicate phases of one or more alkaline earth metals, preferably Ca and/or Mg.

The granular material advantageously further comprises oxides and/or hydroxides of one or more alkaline earth metals, preferably Ca and/or Mg. Examples are: portlandite ($Ca(OH)_2$), free lime (CaO), periclase (MgO), brucite ($Mg(OH)_2$). Especially portlandite reacts quickly with $CO_2$. Consequently, the carbonation reaction can be speeded up by first converting the calcium and optionally also the magnesium oxides into hydroxides. However, the amounts of portlandite are usually not that elevated to form the preferred amounts of carbonates, especially when the granular material has already been stored for some time so that some natural carbonation has already taken place.

The granular material can comprise (or consist of) calcium silicate minerals, such as meso- and sorosilicates. Examples are: Larnite ($Ca_2SiO_4$) also referred to as dicalcium silicate, Cuspidine ($Ca_4Si_2O_2(F,OH)_2$) and Wollastonite ($CaSiO_2$).

The granular material can comprise (or consist of) hydrated calcium silicate minerals of the system $CaO—SiO_2—H_2O$. An example is Tobermorite ($Ca_5Si_6O_{16}(OH)_2 \cdot 4H_2O$).

The granular material can comprise (or consist of) amorphous calcium silicate phases. Those phases can be of the form $(CaO)_x((Na,K)_2O)_y(SiO_2)_z$.

The granular material can comprise (or consist of) magnesium silicate minerals, preferably of the form $MgO—SiO_2$. Examples are: serpentinite ($Mg_3Si_2O_5(OH)_4$), forsterite ($Mg_2SiO_4$) and enstatite ($MgSiO_3$).

The granular material can comprise (or consist of) hydrated aluminium silicate minerals (zeolites). Examples are: stilbite ($NaCa_2Al_5Si_{13}O_{36} \cdot 14H_2O$) and heulandite ($(Ca,Na)_2 \cdot 3Al_3(Al, Si)_2Si_{13}O_{36} \cdot 12H_2O$).

The granular material can comprise (or consist of) calcium magnesium silicate minerals. The granular material can comprise (or consist of) amorphous phases of the $CaO—MgO—SiO_2$ system as well. Examples are: Merwinite ($Ca_3Mg(SiO_4)_2$), Bredigite ($Ca_7Mg(SiO_4)_2$) and Mellite, which is a solid solution series between Akermanite ($Ca_2MgSi_2O_7$) and Gehlenite ($Ca_2Al(Al,Si)O_7$).

The granular material can comprise hydrated calcium-aluminium-sulphate hydroxides. An example is ettringite ($Ca_6Al_2(SO_4)_3(OH)_{12} \cdot 26H_2O$).

The granular material can comprise calcium aluminium oxides and/or amorphous phases of the form $CaO—Al_2O_3$ (e.g. tricalciumaluminate ($Ca_3Al_2O_6$)).

The granular material can comprise calcium aluminium oxide hydrates, preferably of the form $CaO—Al_2O_3—H_2O$.

The granular material can further comprise crystalline and/or amorphous phases of the form $CaO—Al_2O_3—Fe_2O_3$.

The granular material can further comprise crystalline and/or amorphous phases of the form $CaO—Fe_2O_3—H_2O$.

The granular material can further comprise crystalline and/or amorphous phases of the form $CaO—Al_2O_3—Fe_2O_3—H_2O$.

The granular material can further comprise oxides, hydroxides and/or silicates of one or more metals selected from the group consisting of: Al, Fe, Mn, Co, Ni, Cu, Sr, Pb and Zn. The granular material can further comprise oxides, hydroxides and/or silicates of one or more transition metals. Said silicates can refer to crystalline silicates, amorphous silicate phases and/or hydrated silicates.

In order to prevent or at least minimize the occurrence of alkali-silica reactions (ASR) in the (carbonated) artificial stone, the granular material advantageously comprises at most 3 kg/m³ $Na_2O$-equivalent Na and K. The $Na_2O$-equivalent content refers to the content of $Na_2O$ plus 0.658 times the content of $K_2O$ in said material.

Methods of the invention enable to recycle slag resulting from the production and/or processing of ferrous and non-ferrous substances. Slag is a residue generated from those production and/or processing steps. The slag is formed due to additives that are added during the melt and due to impurities of the raw material (e.g. metal ore).

The granular material preferably comprises (or consists of) slag. It can be slag from iron processing (e.g. common steel slag such as LD slag, or stainless steel slag). It can also be slag from the production and/or processing of non-ferrous metals (e.g. copper or zinc). It can be slag from the production of phosphorus (referred to as phosphorus slag).

The raw slag is typically milled, crushed and/or ground and possibly subjected to a physico-chemical treatment, which allows to split the slag in two fractions: a fraction, which can be directly recycled to the production process of the substance as indicated, and a residual fraction, which is typically disposed of. The latter residual fraction is generally referred to as slag.

The granular material can comprise (or consist of) the fines of one or more types of slag from metal manufacturing and/or processing (e.g. steel slag, stainless steel slag, dephosphorization slag, desulfurization slag, phosphorus slag, slag from copper manufacturing and/or processing). Slag that is rapidly cooled, e.g. by the addition of water, is advantageous as a granular material. Rapidly cooled slag comprises substantial amounts of (or consists essentially of) metastable glass, which is an amorphous glass phase. Metastable glass components are arranged in a non-crystalline solution. Those phases are suitable for accelerated carbonation.

Advantageously, the granular material comprises (or consists of) a fine fraction of stainless steel slag, comprising in particular at least 3000 mg/kg, more particularly at least 5000 mg/kg of chromium. The fine fraction of stainless steel slag can comprise at least 300 mg/kg nickel, in particular at least 400 mg/kg nickel and more particularly at least 500 mg/kg nickel. Stainless steel slag normally contains significant amounts of heavy metals, complicating its disposal for environmental and public health reasons.

Methods of the invention appear to be particularly advantageous for the treatment of stainless steel slag, or a fine fraction thereof, comprising at least 30 mg/kg, in particular at least 100 mg/kg, and more particularly at least 1000 mg/kg of molybdenum. Such high molybdenum concentrations are becoming increasingly common in stainless steel slag due to quality requirements (e.g. for improving the corrosion resistance of stainless steel), and until now have further complicated the disposal of such slag. A recycling of said slag is desired in order to avoid disposal in landfills.

Table 1 lists a typical mineralogical composition of stainless steel (SSt) slag which has been brought in contact with water for several months so that most of the free lime (CaO) is converted into $Ca(OH)_2$ (portlandite). At least part of the portlandite is further converted into $CaCO_3$ (by natural carbonation in the presence of atmospheric carbon dioxide). In contrast to this weathered slag, fresh stainless steel slag thus comprises free lime (CaO) instead of calcium hydroxide. Moreover, due to the high temperatures in the metal furnace wherein the stainless steel slag is produced, fresh stainless steel slag does not comprise carbonates but instead more CaO. Fresh stainless steel slag therefore comprises more material which is reactive for carbonation than the weathered steel slag used in the experiments described hereinafter. FIG. 1 A-B shows a typical particle size distribution of SSt slag. The particle size distribution was determined using a Mastersizer (Malvern Instruments) laser diffractometer. The grains have a size less than 600 μm.

Figure 2:
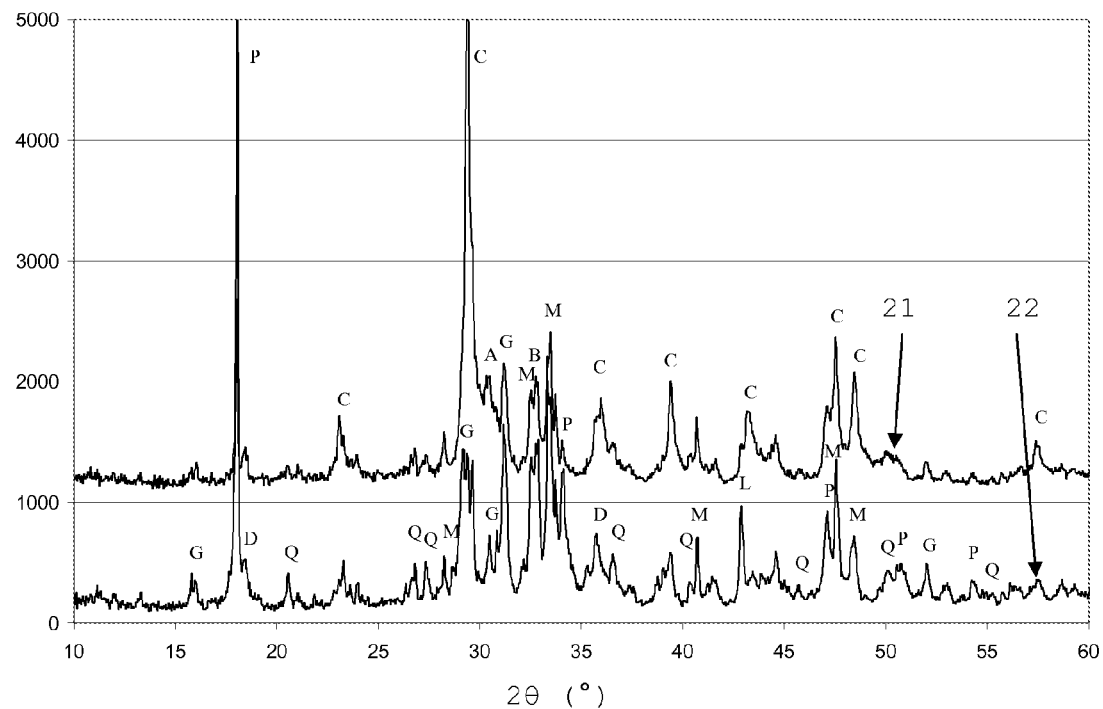
FIG. 2 represents XRD diffraction patterns of stainless steel slag. Pattern 21 refers to a compacted (182 kg/cm$^2$) carbonated (140° C., 2 MPa, 18 hours) specimen and pattern 22 to a compacted non carbonated specimen. P=Portlandite (Ca(OH)$_2$), L=Periclase (MgO), C=Calcite (CaCO$_3$), A=Ankerite (Ca(Fe,Mg)(CO$_3$)$_2$), B=Bredigite Ca$_{14}$Mg$_2$(SiO$_4$)$_8$, M=Merwinite Ca$_3$Mg(SiO$_4$)$_2$, K=Kirschsteinite (CaFeSiO$_4$), G=Gehlenite (Ca$_2$Al$_2$SiO$_7$) and/or Akermanite (Ca$_2$Mg(Si$_2$O$_7$)), Q=Quartz (SiO$_2$), D=Donathite (magnetite and/or chromite). Counts/s are set out against 2θ values (x-axis).
Figure 3A:
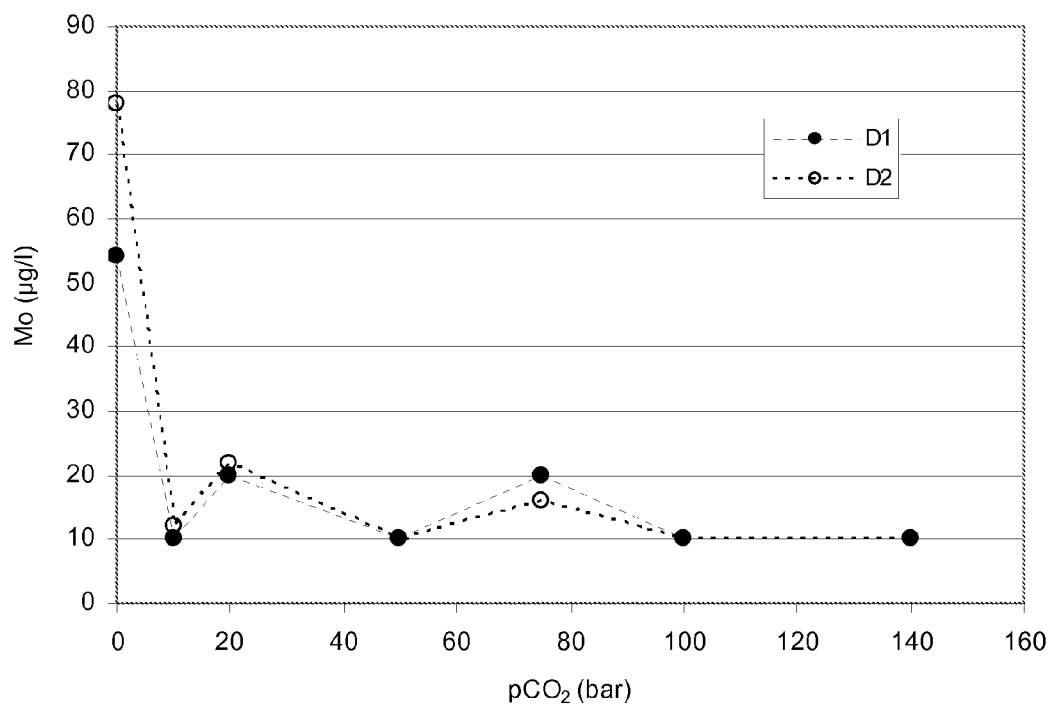
FIG. 3A represents the concentration of Mo (μg/l) for the blocks as identified.
Figure 3B:
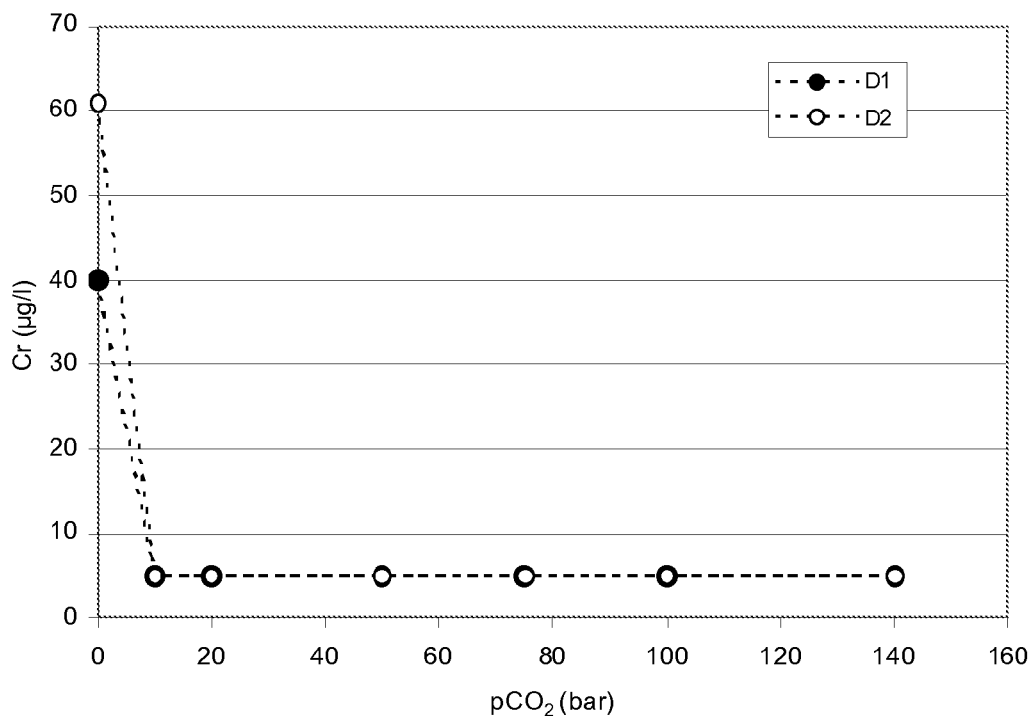
FIG. 3B represents the concentration of Cr (μg/l) for the blocks as identified.
Figure 3C:
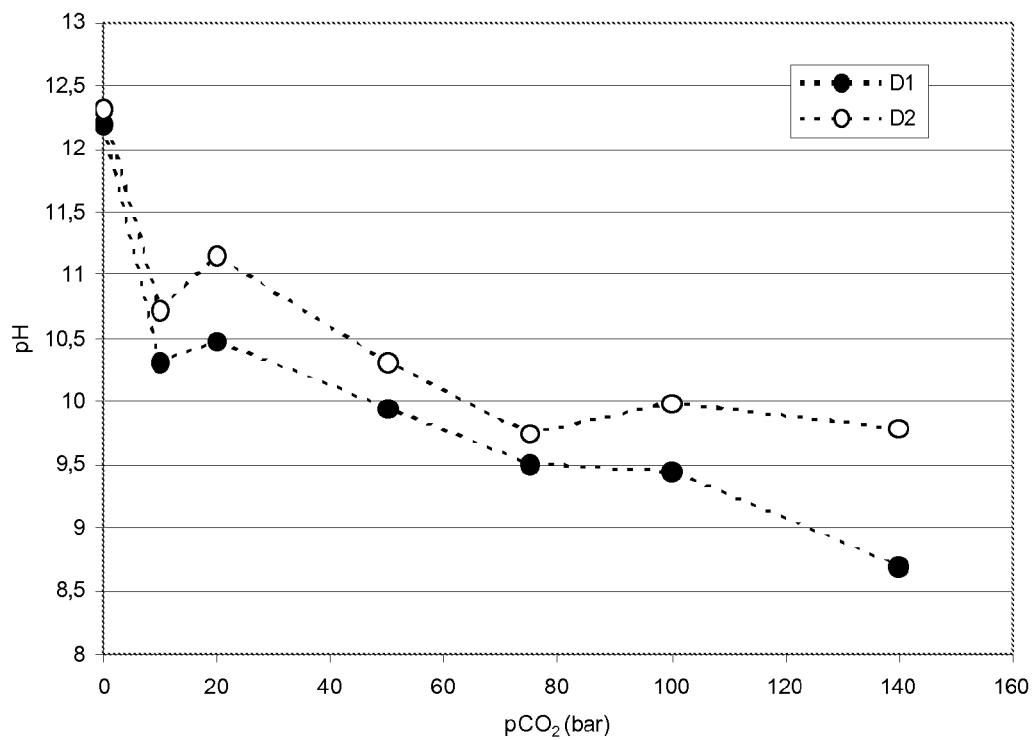
FIG. 3C represents the pH of the solution after immersion of the blocks as identified.
Figure 3D:
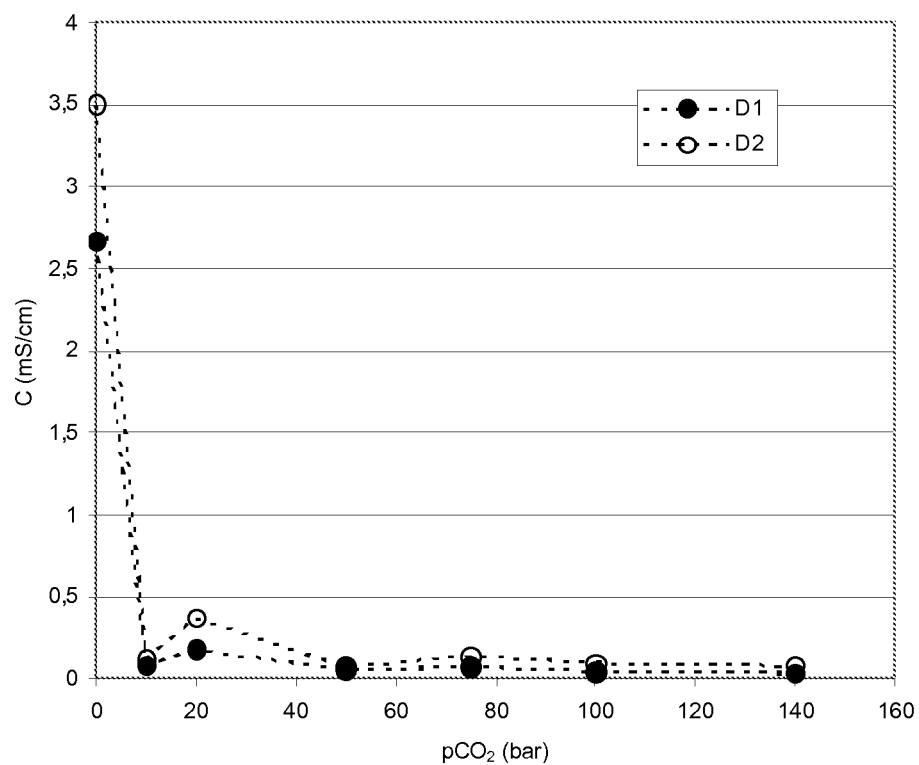
FIG. 3D represents the conductivity C (mS/cm) of the solution after immersion of the blocks as identified.
Figure 4A:
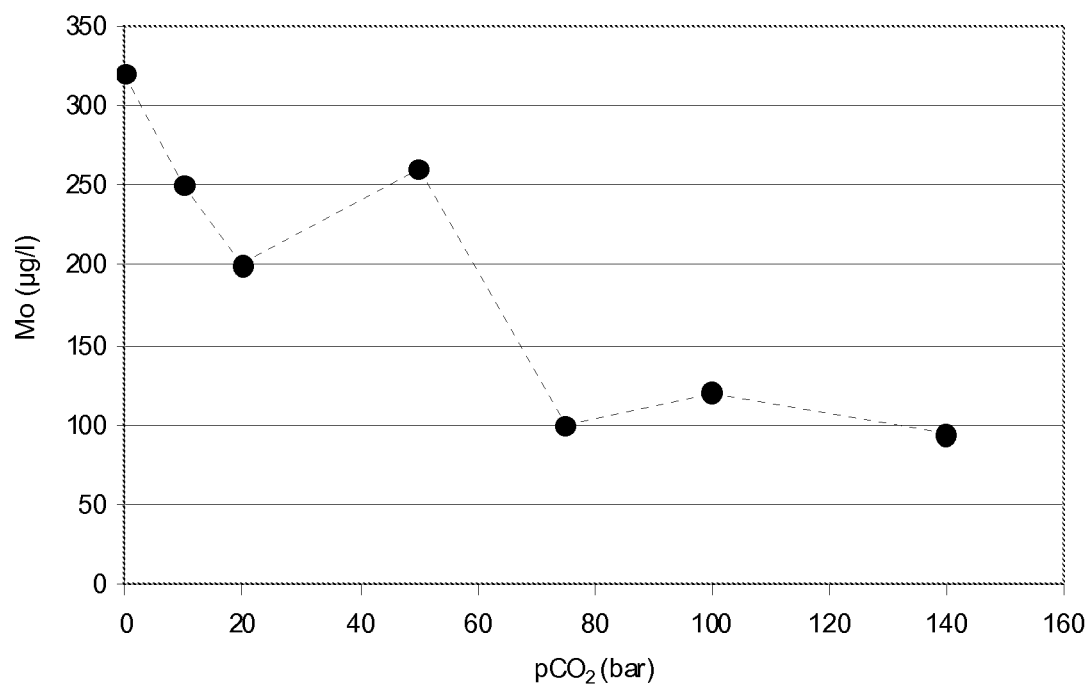
FIG. 4A represents the concentration of Mo (μg/l) for the blocks as identified.
Figure 4B:
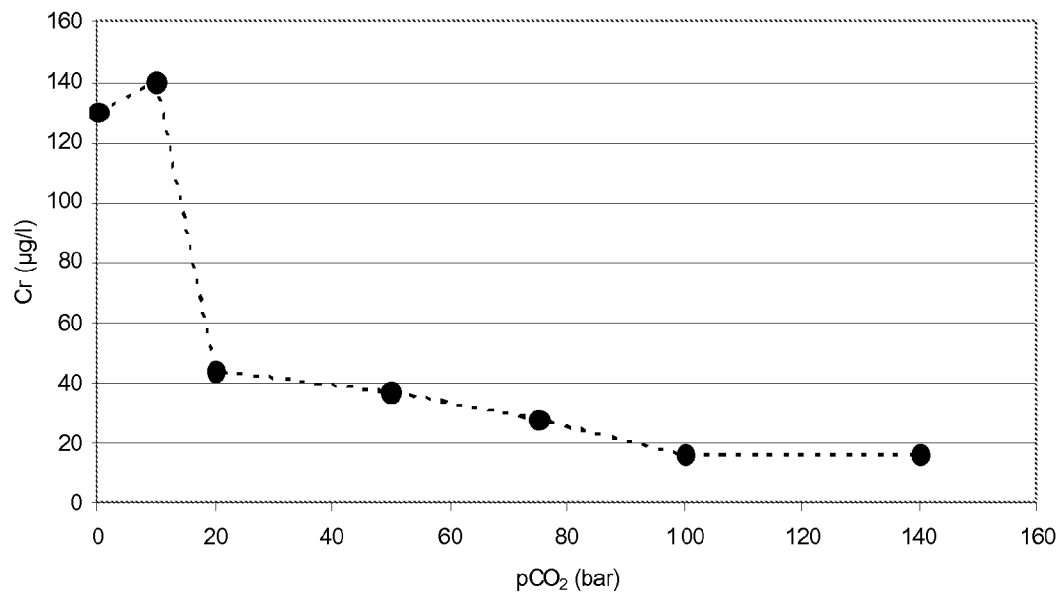
FIG. 4B represents the concentration of Cr (μg/l) for the blocks as identified.
Figure 4C:
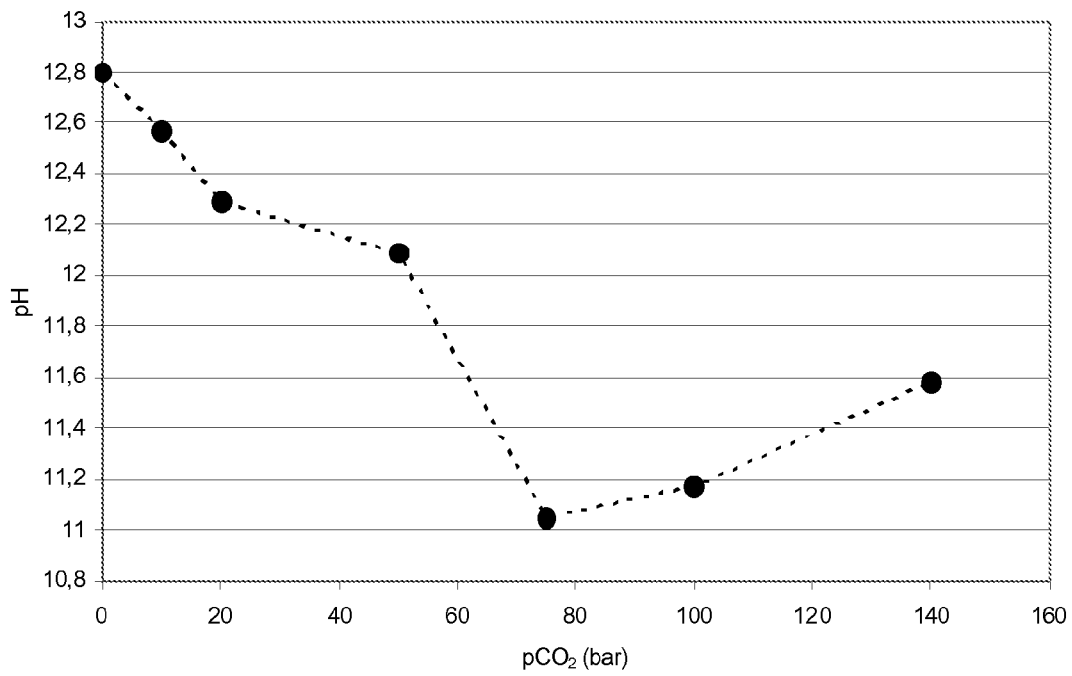
FIG. 4C represents the pH of the solution after immersion of the blocks as identified.
Figure 4D:
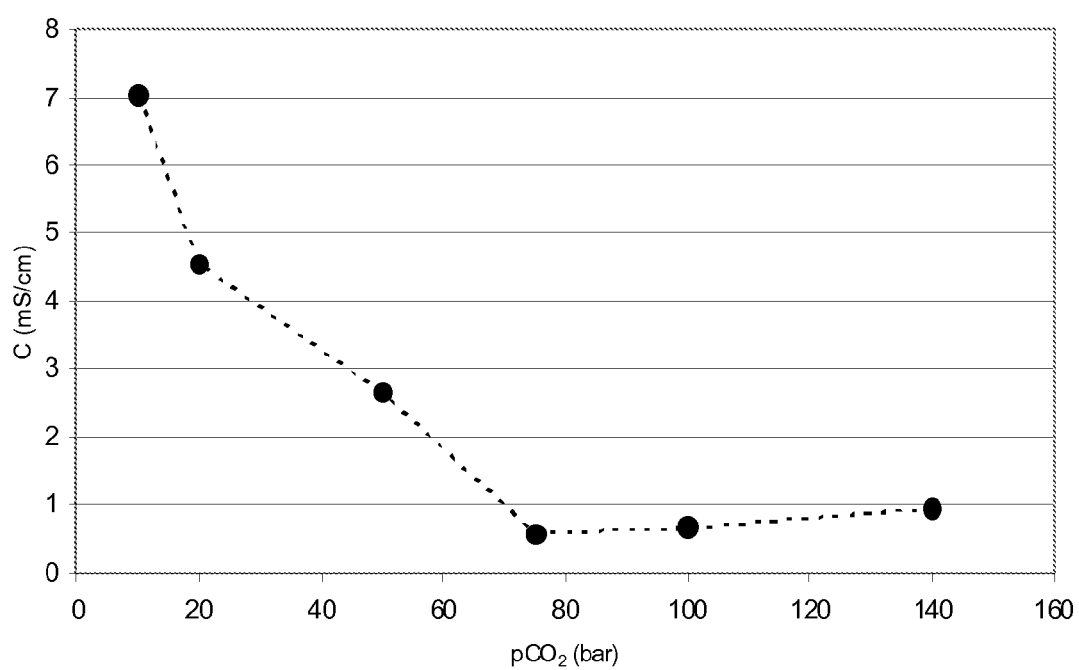
FIG. 4D represents the conductivity C (mS/cm) of the solution after immersion of the blocks as identified.

Table 2 gives the chemical composition of a typical stainless steel slag. The values of the micro-elements are measured with ICP-AES (Inducted Coupled Plasma-Atomic Emission Spectrometry) on samples, which have been treated with a $HF/HNO_3/HCl$ solution according to the compendium of methods stipulated by the Flemish legislation (CMA2/II/A.3 of July 2005 and CMA/2/I/B.1 of November 2006). The chemical composition of the macro-elements was determined by fusion-XRF (X-ray fluorescence) according to ISO 14869-2002/EN 15309:2007. The mineralogical composition (crystalline phases) was determined by scanning from 2° (2θ) to 120° (2θ) using a Philips X'Pert X-ray diffractometer using $CuK\alpha$ (40 kV) radiation and is represented in FIG. 2, graph 22.

The total Mo concentration in the slag sample of table 2 was rather low (62 mg/kg) but in the future the stainless steel slags are expected to comprise more Mo.

In the SSt slag, Mo is predominantly associated with metallic inclusions substantially comprising Cr and/or Fe. Mo is often observed as being trapped (included) as droplets in crystals of chromite (e.g. $MgCr_2O_4$), of chromium oxide ($Cr_2O_3$), or in the surrounding Ca—Mg-silicate minerals and glass phases.

Chromium is predominantly present in the residual fraction in the form of $Cr_2O_3$ or $MgCr_2O_4$ and in metallic inclusions as well.

Molybdenum and chromium present in the slag can be very mobile and can hence be subjected to prompt leaching from the slag. By consequence, the slag can not be disposed of in ordinary landfills; it should be treated as special waste, which makes disposal more costly.

Hence, a treatment is needed which allows to remove the hazardous leaching problems of the slag.

The inventors found that by subjecting the slag to reaction conditions for carbonation as identified by the invention, the abovementioned leaching problems are obviated. In addition to a chemical and physical entrapment of contaminants (or hazardous elements) due to the mineralogical changes occurring by the reactions taking place, contaminants that are freed within the reacting phases can also be eluted by the water which is formed by the carbonation reactions and which is subsequently expelled from the compact when the pores are reduced in size by the formation of carbonates and moreover get saturated by the formed water. Such water is present in a liquid state as the temperature remains below boiling point. The water containing the contaminants can be collected at the end of the reacting step and further processed.

Methods of the invention hence also allow to extract hazardous elements, such as Mo, Cr, etc. from the granular material that is carbonated. The mainly carbonate bonded article hence advantageously comprises a lower amount of contaminants compared to the granular material.

The stainless steel slag hence can constitute the granular material in the method according to the invention. In that case, the inventors have found that the reacted material (the carbonated article) is able to immobilise to a high degree the Mo and Cr which has not leached during carbonation reactions, both physically and chemically. A higher immobilisation of Cr and Mo can be achieved by using higher temperatures and/or higher (partial $CO_2$) pressures. By consequence, stainless steel slag can be converted into an inert, or at least a less harmful material. Furthermore, the method of the invention opens possibilities to convert the stainless steel slag into a product having economical value.

Even for stainless steel slag contents in the granular material of at least 40%, and more preferably at least 60% by weight, the temperature and pressure in the reacting step and the moisture content of the compacts at the beginning of the reacting step can be so selected that the Cr leaching from the article is preferably less than 0.1 mg/l and/or the Mo leaching from the article is preferably less than 0.15 mg/l (measured according to DIN 38414-S4/EN 12457-4). In such cases the temperature is preferably at least 110° C., more preferably at least 130° C. The pressure is preferably at least 1 MPa, more preferably at least 2 MPa. The moisture content preferably falls in between 90% and 20% of the moisture saturation content, more preferably between 80% and 20%, most preferably between 80% and 40%.

The granular material can also be (or comprise) another waste material. Other examples of waste materials suitable for a method of the invention include: biomass ash, municipal solid waste incinerator (MSWI) bottom ash and fly ash.

Even for MSWI bottom ash contents in the granular material of at least 40%, more preferably at least 60% by weight, the temperature and pressure in the reacting step and the moisture content of the compacts at the beginning of the reacting step can be so selected that the Cu leaching from the article is preferably less than 2 mg/l and/or the Mo leaching from the article is preferably less than 0.15 mg/l (measured according to DIN 38414-S4/EN 12457-4). In such cases, the temperature is preferably at least 110° C., more preferably at least 130° C. The pressure is preferably at least 1 MPa, more preferably at least 2 MPa. The moisture content preferably falls in between 90% and 20% of the moisture saturation content, more preferably between 80% and 20%, most preferably between 80% and 40%.

Construction and demolition cement waste, concrete waste and construction waste can constitute in part the granular material. The amount of such materials forms preferably at most 20%, more preferably at most 10% and even more preferably at most 5% of the weight of the granular material. Preferably, the granular material does not comprise said waste materials.

The granular material can comprise calcium silicate stone.

The granular material can be (or comprise) a natural mineral material. Examples of natural mineral materials are olivine, wollastonite and serpentinite. A natural mineral material can be sand, such as sea sand or quartz sand.

Two or more of the above mentioned materials can be mixed to optimise the accelerated carbonation process. The granular material can be a combination of a waste material and a natural material.

Alkaline earth metal ions and preferably other metal ions (e.g. transition metals) that can easily be leached from the (silicate) phase in which they are provided can contribute to the carbonation process. Those metals hence can advantageously participate in the carbonation process.

TABLE 1

Mineralogical composition of stainless steel slag which has already been brought in contact for several months with water so that its lime (CaO) is converted into Ca(OH)$_2$ and partially further into CaCO$_3$.

| Mineralogical composition | |
|---|---|
| Portlandite (Ca(OH)$_2$) | ++++ |
| Calcite (CaCO$_3$) | ++ |
| Silicates | |
| Tricalcium magnesium orthosilicate (Ca$_3$Mg(SiO$_4$)$_2$) | +++ |
| Bredigite (Ca$_{14}$Mg$_2$(SiO$_4$)$_8$) | +++ |
| Akermanite (Ca$_2$MgSi$_2$O$_7$)-Gehlenite (Ca$_2$Al$_2$SiO$_7$) | ++ |
| Cuspidine (Ca$_4$Si$_2$O$_7$(F,OH)$_2$) | ++ |
| Calcium Magnesium Iron silicate (Ca$_{0.90}$Mg$_{0.71}$Fe$_{0.25}$Si$_2$O$_6$) | + |
| Dicalcium silicate (Ca$_2$SiO$_4$) | + |
| Oxides | |
| Periclase (MgO) | ++ |
| Magnesium chromite (MgCr$_2$O$_4$) | ++ |

"+" symbols indicate higher relative quantities.

TABLE 2

Chemical composition of a stainless steel slag from which the metals have been removed. Values of micro-elements measured on a sample according to ICP-AES. Values of macro-elements, which are expressed in oxide form, were measured by fusion-XRF.

| Element | Unit | Stainless steel slag |
|---|---|---|
| Macro-Element | | |
| Aluminium (Al$_2$O$_3$) | % by weight | 2.3 |
| Calcium (CaO) | % by weight | 46 |
| Iron (Fe$_2$O$_3$) | % by weight | 1.0 |
| Magnesium (MgO) | % by weight | 7.3 |
| Manganese (MnO) | % by weight | 0.7 |
| Silicon (SiO$_2$) | % by weight | 21 |
| Phosphorus (P$_2$O$_5$) | % by weight | 0.012 |
| Potassium (K$_2$O) | % by weight | 0.010 |
| Titanium (TiO$_2$) | % by weight | 0.72 |
| Sodium (NaO) | % by weight | 0.21 |

| Micro-Element | | SSt slag | Micro-Element | | SSt slag |
|---|---|---|---|---|---|
| Chromium (Cr) | mg/kg | 5100 | Mercury (Hg) | mg/kg | <0.1 |
| Molybdenum (Mo) | mg/kg | 62 | Lead (Pb) | mg/kg | <13 |
| Antimony (Sb) | mg/kg | 60 | Nickel (Ni) | mg/kg | 430 |
| Arsenic (As) | mg/kg | <4.0 | Selenium (Se) | mg/kg | <10 |
| Barium (Ba) | mg/kg | 100 | Tin (Sn) | mg/kg | <10 |
| Cadmium (Cd) | mg/kg | <0.4 | Vanadium (V) | mg/kg | 180 |
| Cobalt (Co) | mg/kg | 7.5 | Zinc (Zn) | mg/kg | 40 |
| Copper (Cu) | mg/kg | 41 | | | |

The granular material in the method of the invention can comprise a material which is (substantially) inert to the carbonation reactions as identified. The inert material can be added in order to obtain in the compacts the levels of porosity and intrinsic permeability as indicated. It can be added for increasing the strength of carbonated articles.

Examples of materials that are inert to the carbonation reaction of the invention are sea sand, quartz sand, porphyry sand, limestone sand and inert waste materials. The indicated inert materials advantageously compose at most 40%, more advantageously at most 30% and most advantageously at most 20% by weight of the granular material.

In the methods of carbonation according to the invention, the granular material does not need to be treated with caustic materials, neither are electrolytes to be used for increasing the reactivity of the granular material for the carbonation reaction. The addition of binders, such as Portland cement, for linking the grains together is also not necessary so that binders are thus preferably not used. The method according to the invention is hence less cumbersome, environment-friendly and easier to implement than some methods of the prior art.

Therefore, the granular material comprises preferably no or an amount of ground granulated blast furnace slag less than or equal to 5% by weight, more preferably less than or equal to 2.5% by weight. The granular material comprises preferably no or an amount of class-F fly ash less than or equal to 5% by weight, more preferably less than or equal to 2.5% by weight. Preferably, the granular material comprises no or an amount of Portland cement and Portland clinker less than or equal to 7% by weight, more preferably less than or equal to 5% by weight, even more preferably less than or equal to 2.5% by weight.

Hence, binding phases other than carbonates are advantageously not formed, or formed only in limited amounts in the mainly carbonate bonded article by methods of the invention. The granular material is advantageously so selected, that it comprises no, or at most an amount of material having hydraulic binding properties, such that no or at most 2.2% by weight of calcium silicate hydrate phases are formed in the article (or in the compact), with values of at most 1.7% by weight being preferred, values of at most 1.0% by weight being more preferred and values of at most 0.5% by weight being most preferred. Such calcium silicate hydrate content refers to the content after 28 days of aging subsequent to carbonation (under conditions according to Belgian standard NBN B15-237, viz. stored for 28 days at 20±2° C. under water or in an atmosphere with ≥90% relative humidity) and refers to the calcium silicate hydrate phases formed in the article (or in the compact) in addition to the CSH phases that were possibly already present in the granular material. Calcium silicate hydrate content can be determined by techniques described by Olson and Jennings in "Estimation of C—S—H content in a blended cement paste using water adsorption", Cement and Concrete Research, 2001, pp. 351-356.

Carbonation of Compacts of the Granular Material

The following carbonation reactions can occur in methods of the invention for the following reactive materials.

Calcium silicate minerals (e.g. wollastonite):

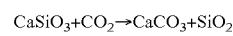
$$CaSiO_3 + CO_2 \rightarrow CaCO_3 + SiO_2$$

Magnesium silicate minerals (examples olivine and serpentine):

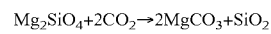
$$Mg_2SiO_4 + 2CO_2 \rightarrow 2MgCO_3 + SiO_2$$

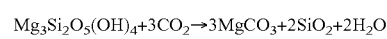
$$Mg_3Si_2O_5(OH)_4 + 3CO_2 \rightarrow 3MgCO_3 + 2SiO_2 + 2H_2O$$

Calcium magnesium silicates (example merwinite):

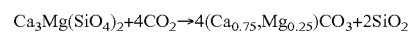
$$Ca_3Mg(SiO_4)_2 + 4CO_2 \rightarrow 4(Ca_{0.75},Mg_{0.25})CO_3 + 2SiO_2$$

Hydrated calcium silicates (examples cuspidine and tobermorite):

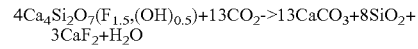
$$4Ca_4Si_2O_7(F_{1.5},(OH)_{0.5}) + 13CO_2 \rightarrow 13CaCO_3 + 8SiO_2 + 3CaF_2 + H_2O$$

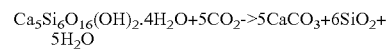
$$Ca_5Si_6O_{16}(OH)_2 \cdot 4H_2O + 5CO_2 \rightarrow 5CaCO_3 + 6SiO_2 + 5H_2O$$

Amorphous calcium silicate phases:

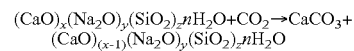
$$(CaO)_x(Na_2O)_y(SiO_2)_z \cdot nH_2O + CO_2 \rightarrow CaCO_3 + (CaO)_{(x-1)}(Na_2O)_y(SiO_2)_z \cdot nH_2O$$

Oxides and hydroxides (e.g. portlandite, lime and periclase):

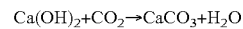
$$Ca(OH)_2 + CO_2 \rightarrow CaCO_3 + H_2O$$

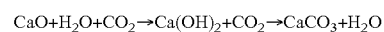
$$CaO + H_2O + CO_2 \rightarrow Ca(OH)_2 + CO_2 \rightarrow CaCO_3 + H_2O$$

$$MgO + H_2O + CO_2 \rightarrow Mg(OH)_2 + CO_2 \rightarrow MgCO_3 + H_2O$$

Hydrated calcium aluminium sulphate hydroxides (example ettringite):

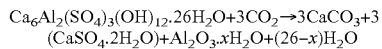

$$Ca_6Al_2(SO_4)_3(OH)_{12}.26H_2O+3CO_2 \rightarrow 3CaCO_3+3(CaSO_4.2H_2O)+Al_2O_3.xH_2O+(26-x)H_2O$$

The reaction conditions according to the invention can cause additional carbonates to form than merely calcite, such as for example ankerite, aragonite and/or vaterite. In addition, in case amorphous phases are present, those can react as well. The elevated temperature and pressure as indicated can cause metal phases such as cuspidine, tobermorite, wollastonite, pseudo-wollastonite, bredigite, merwinite, gehlenite and/or akermanite to be involved in the carbonation reaction. Hence, a high amount of carbonates can be formed. Furthermore, said carbonates can be formed uniformly distributed throughout the compact. This also contributes to the formation of a carbonated article showing high compressive strengths as indicated and improved physico-chemical properties. Properties of articles that can be obtained by methods of the invention will be identified further.

A mechanism of forming an article by carbonation according to the invention has been observed to be the following. Carbonate shells form around the grains. These shells link the grains together in a network to form a stone. It is also observed that after the carbonation reaction, outer zones (depletion zones) of calcium silicate crystals and especially of amorphous calcium silicate glass phases can be poor in Ca due to a diffusion of Ca to a surrounding carbonate matrix. Hence, the carbonates formed by the carbonation reaction can link the original grains together to form a cohering (but porous) article.

An advantage of the method according to the invention is that the method allows to sequester large amounts of carbon dioxide.

Methods of the invention are preferably used for producing carbonated articles that are suitable for use as construction material, such as artificial stones, e.g. building bricks, paving bricks, tiles, beams. Construction materials, obtained by methods of the invention, can replace ceramic construction materials. This is made possible by the granulometry of the granular material (can be very fine), which advantageously results in smooth surfaces, a low porosity and/or low water absorption. Furthermore, the high compressive strengths that can be attained for the article allow to reduce the thickness of such construction materials.

Carbonated Articles

A second aspect of the invention relates to an article as can be obtained by a method of the invention. The article according to the invention is mainly carbonate bonded. It is preferably suitable as a material for building and construction. The article has a carbonate ($CO_3^{2-}$) content of at least 5% by weight, preferably at least 10% by weight, more preferably at least 15% by weight, particularly preferably at least 20% by weight and most preferably at least 25% by weight (in addition to the carbonate content of the granular material).

The article is mainly carbonate bonded, which refers to the fact that particles or grains within the article are mainly bonded to one another by means of carbonate phases, which form the main binding or linking matrix (as explained hereabove the main binding matrix is to be understood as that matrix which provides more than 50% of the final compression strength of the article). Hence, other binding phases are advantageously not present, or present only in limited amounts. Therefore, the content of calcium silicate hydrate phases in the matrix binding the grains together is advantageously at most 2.2% by total weight of the article, with values of at most 1.7% by weight being preferred, values of at most 1.0% by weight being more preferred and values of at most 0.5% by weight being most preferred. The content of calcium hydrate phases is not to be considered in determining the content indicated above. Preferably, the mainly carbonate matrix linking grains together does not comprise calcium silicate hydrate phases.

The total content of ground granulated blast furnace slag, class-F fly ash, Portland cement and Portland clinker in the mainly carbonate bonded article is preferably less than or equal to 7% by weight, more preferably less than or equal to 5% by weight and even more preferably less than or equal to 2.5% by weight. The presence of these materials refers to non-hydrated and/or non-carbonated fractions of such materials that were present in the granular material from which the article was made (only a surface portion of such particles contribute to the hydraulic reactions so that possibly most of the material remains unaffected). Most preferably, said materials are not used in producing the article, so that the article does not comprise any of said materials.

The carbonates are advantageously uniformly distributed throughout the article. Uniform distribution can be assessed by identifying volumes of identical size in the article and determining the carbonate content of said volumes. The volumes preferably have a size of 1 $cm^3$, but sizes of 8 $cm^3$, 1 $dm^3$, or 0.125 $cm^3$ can be used as well, depending on the overall size of the article. The number of volumes to take into account is dependent on the article size, but is preferably at least three. Preferably, the carbonate content in said volumes fall within a range between 0.5 and 1.5 times the average carbonate content of the article, more preferably within a range between 0.75 and 1.25 times the average carbonate content of the article and particularly preferably within a range between 0.9 and 1.1 times the average carbonate content of the article. The average carbonate content of the article can be considered to be the average carbonate content of the volumes.

The article hence can be made by carbonation of the granular materials as identified, which can comprise waste materials, such as slag, municipal solid waste incinerator bottom ash, biomass ash, etc. By consequence, the article can be a recycled material (product) that is environment friendly and avoids unnecessary disposal of waste material in landfills.

An article of the invention preferably comprises different types of alkaline earth metal carbonates. The article can comprise $CaCO_3$ as calcite, as aragonite, or both. The article can comprise magnesite ($MgCO_3$). The article can comprise ankerite ($Ca(Fe,Mg)(CO_3)_2$). An article of the invention preferably comprises mixtures of above identified elements.

The article can comprise grains (particles) of one or more alkaline earth metal silicates. Said grains are arranged (embedded) in a carbonate matrix.

Carbonated articles of the invention advantageously comprise carbonate shells surrounding grains of alkaline earth metal silicates (e.g. silicate crystals and/or other silicate phases). It is observed that after the carbonation reaction, outer zones of the silicate grains can be poor in the alkaline earth metal (e.g. Ca) due to a diffusion of said metal to a surrounding carbonate matrix. Hence, the carbonates formed by the carbonate reaction can link the original grains together to form a strong compound.

A carbonated article of the invention can further comprise one or more of the following elements: Cr, Mo, Sb, As, Cd, Co, Cu, Hg, Pb, Mn, Ni, Se, Sn, V and Zn. It can also further comprise Al, Ti and/or Fe. It can comprise Ba. According to an embodiment, the article comprises Fe, Cr and/or Mo. In another embodiment, the article comprises one or more of the following elements: Ni, Zn, Mn and Al. In still another embodiment, the article comprises one or more of the following elements: Ba, As, Cd and Pb. The identified elements can be comprised in the raw (granular) material of which the article was produced, such as stainless steel slag, phosphorus slag, or bottom ash of e.g. municipal solid waste incinerators. It is an advantageous property of an article of the invention that the leaching of one or more of the elements as indicated is at least reduced.

The article can further comprise carbonates of Fe and/or Al. The article can further comprise chromium oxide and/or magnesium chromite. The above elements can result from the carbonation of stainless steel slag.

The article according to the invention advantageously has a compressive strength of at least 15 MPa, with a compressive strength of at least 30 MPa being preferred and a compressive strength of at least 45 MPa being particularly preferred. More advantageously, it has a compressive strength falling in the range between 15 MPa and 100 MPa, preferably in the range between 30 MPa and 100 MPa, more preferably in the range between 45 MPa and 100 MPa. An article of the invention can have a compressive strength in the range between 30 MPa and 80 MPa. The compressive strength is advantageously proportional to the carbonate content of the article.

The article according to the invention preferably has a porosity smaller than 27% by volume, more preferably smaller than 22% by volume, even more preferably smaller than 17% by volume. The porosity of the carbonated article can be at least 5% by volume.

Porosity levels of the carbonated article, as well as the porosity of the compact used to make the article, are to be measured by mercury intrusion (Hg porosimetry), such as with a Quantachrome Poremaster-60-GT (according to DIN 66133).

The pH of water in contact with the carbonated article will be lower than a traditional cement based building material. pH-values as low as 9.0 have been measured after immersion of the article in demineralised water during 18 hours in a liquid/solid ratio of 4.5. The pH appears to be inversely proportional to the amount of carbonates present in the article. The pH also appears to be dependent on the nature of the reactive materials used for the production of the article. A range in pH between 9.0 and 11.5 was observed for water in contact with different articles produced according to the method of the invention.

Articles of the invention are advantageously environmentally safe. Pollutants that are possibly present in a leachable form in the raw (granular) material of which the article is produced (e.g. Mo, Cr in stainless steel slag) are advantageously physically and/or chemically stabilized in an article of the invention. More advantageously, leachable pollutants are both physically and chemically stabilized. The article can hence be in conformity with national standards, such as e.g. for construction materials.

The physical stabilization can be due to the decreasing porosity in the carbonate matrix during carbonation, denying physical access from the outside to the pollutant.

The chemical stabilization can be attributed to the formation in the article of bonds with the pollutants of increased strength compared to the raw (granular) material. This can result from changes in pH, additional formation of active adsorption sites (e.g. active oxides) and/or the incorporation of pollutants in the (mineral) carbonate matrix.

A preferred use of an article of the invention is as construction material, e.g. a building brick, a paving brick, a floor tile, or even a beam.

Articles of the invention can advantageously have a low water absorption. The water absorption of the article is preferably lower than 15% by weight, more preferably lower than 12.5% by weight, even more preferably lower than 10% by weight, most preferably lower than 7.5% by weight.

EXAMPLES

Examples of aspects of the invention are now presented. Two powders are prepared. Powder 1 consists of stainless steel slag from which the metal inclusions have been removed and in the form of a powder (a granular material) having a particle size distribution according to the graph R3 presented in FIG. 1 A-B ($D_{60}$=60 µm and $D_{10}$=5 µm, U=$D_{60}/D_{10}$=12). Powder 2 is composed for 70% by weight of powder 1 and for the remaining 30% of sea sand, being an inert mineral material for the carbonation reaction and having a particle size distribution as shown in the graphs of FIG. 1 C-D ($D_{60}$=320 µm and $D_{10}$=200 µm, U=1.6). The moisture content of both powder 1 and powder 2 is adjusted to 12% by weight of dry matter by adding the required amount of water after having dried the powder (at 70° C.) and determined the moisture content.

Powder 1 and powder 2 are each cast in moulds having dimensions of 62×62×62 mm. Both powders are then compacted with the aid of a hydraulic press with a compaction pressure of 182 kg/cm$^2$ (17.8 MPa). The resulting compacts of powder measured 62×62×32 mm. The porosity and permeability of powder 1 and powder 2 compacts is listed in table 4. The powder 1 compacts had a porosity of about 31.8% by vol. (Hg porosimetry) and a permeability of $8.36 \cdot 10^{-10}$ cm$^2$. The powder 2 compacts had a porosity of about 29.1% by vol. (Hg porosimetry).

The compacts of powder 1 and powder 2 were put in a reactor for carbonation during 18 hours. Different compacts were subjected to different reaction conditions. Reaction temperatures (temperatures of the ambient surrounding the compacts) were 70° C., 100° C., 140° C. and 210° C. Carbon dioxide atmospheres (100% $CO_2$ initially) at pressures of 0.5 MPa, 1 MPa, 2 MPa, 5 MPa, 7.5 MPa, 10 MPa and 14 MPa were tested in the reactor (an autoclave). Six replicate compacts were prepared for each reactor condition. The atmospheres in the autoclave were maintained at the indicated pressures by supplying carbon dioxide gas when pressure diminished (due to consumption of $CO_2$ by the carbonation reactions).

Figure 8:
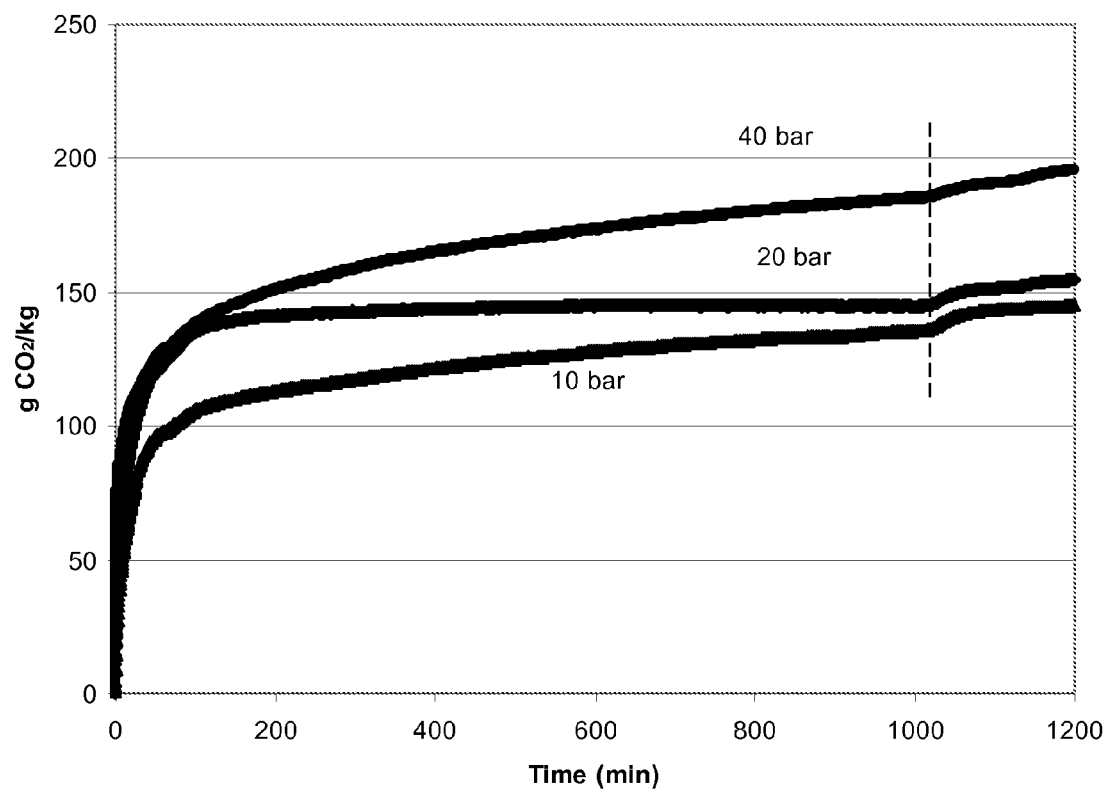
FIG. 8 shows graphs of carbonation reaction kinetics for powder 1 compacts (62×62×32 mm after compaction at 182 kg/cm$^2$ compaction pressure and 12% moisture content) carbonated at 140° C. and pressures of 1, 2 and 4 MPa. Reaction conditions: starting temperature 20° C., pressurizing to 1.4 MPa, heating to 140° C. at about 2° C./min. and cooling down after 16 hours at about 2° C./min. The cumulative uptake of CO$_2$ in function of elapsed time is shown.

The reaction kinetics for the powder 1 compacts are shown in FIG. 8 for different pressures and 140° C. temperature. $CO_2$ uptake increases with increasing reaction pressure, but the majority of the $CO_2$ is taken up during the first two hours. During the first hour, almost one third of the total carbon dioxide was taken up. The step-like increase in $CO_2$ uptake at around 1000 minutes (dashed vertical line in FIG. 8) corresponds to the time in which the reactor is cooled down. This sudden increase in $CO_2$ uptake is due to differential thermal expansion between the water present in the pores and the granular material. As water has a much higher coefficient of thermal expansion, the water level in the pores decreases during cooling, so that pores which were saturated prior to cooling, are made better accessible again to the carbon dioxide, resulting in a continued carbonation.

Figure 9:
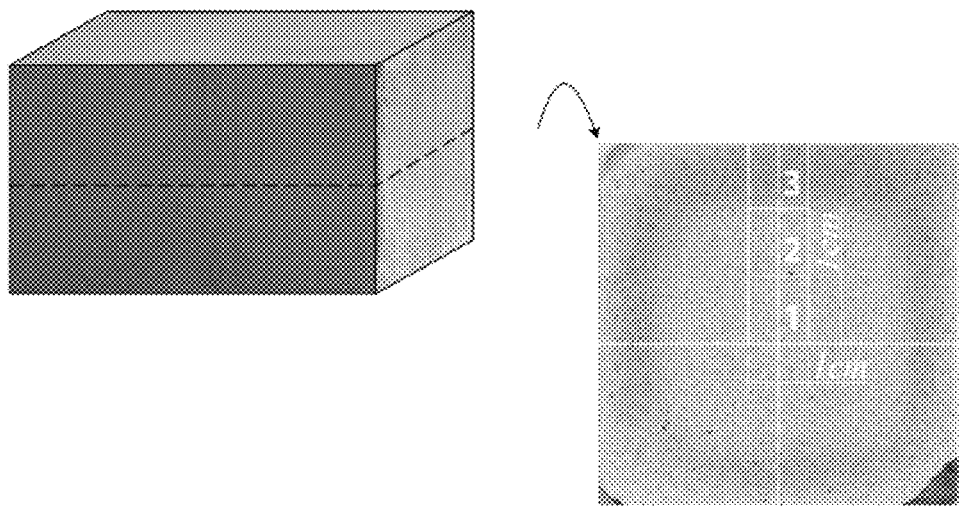
FIGS. 9A and 9B represent the results of impregnation of a carbonated block and a non-carbonated compact from powder 1 by phenolphthalein.
Figure 9:
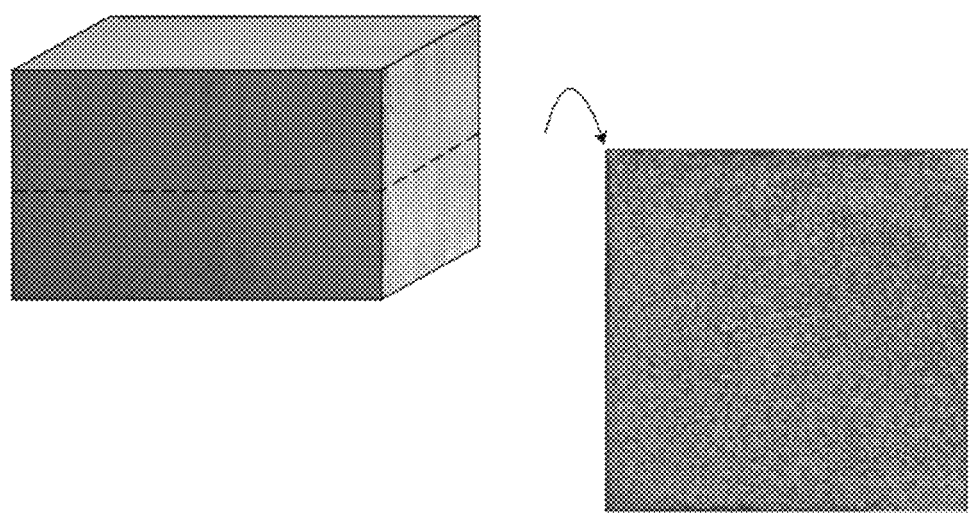

On the carbonated blocks from powder 1, a test was carried out to check the uniform distribution of the carbonates formed. Therefore, a carbonated block (140° C., 2 MPa, 18 hours) and a non-carbonated compact (12% moisture content) were sawed according to the dashed line as in FIG. 9, along a plane parallel to the larger base of the rectangle. The plane of saw was impregnated with phenolphtalein, a pH indicator which colours red at a pH>10 and which remains colourless at a pH<9. As the non-carbonated powder 1 compact resulted to be quite alkaline (pH>12.5), such compact coloured uniformly red after treatment with phenolphtalein, which is shown in FIG. 9 B. FIG. 9 A shows the result of phenolphtalein treatment on a carbonated block, wherein the whole plane of saw did not colour at all (uniformly colourless). As carbonation causes a decrease in pH, the latter experiment indicates that carbonation occurred uniformly throughout the block.

In a further test, three cubes of dimensions 1×1×1 cm$^3$ as indicated in FIG. 9 A were isolated from a carbonated block from powder 1 (140° C., 2 MPa, 18 hours), and the total carbon content was determined. The carbon content, expressed in g $CO_2$/kg, resulted to be 182 g $CO_2$/kg for cube 1 as indicated in FIG. 9 A, 186 g $CO_2$/kg for cube 2 and 170 g $CO_2$/kg for cube 3. As the deviation from the average of 179.3 g $CO_2$/kg for the three cubes is maximally 9.3 g $CO_2$/kg, or about 5%, this indicates uniform carbonation. For comparison, the total carbon content of a non carbonated compact from powder 1 amounted to 36 g $CO_2$/kg.

Compressive strength tests were carried out on the carbonated blocks (articles) after 7 days of aging using a Instron 8502 and a cross-head speed of 5 mm/min (according to Belgian standard NBN B15-220). Table 3 lists the results of the compressive strength tests, which show that compressive strengths as high as 65 MPa can be obtained. Powder 1 blocks show a higher compressive strength than powder 2 blocks. The compressive strength seems to stabilise for pressures higher than 7.5 MPa.

The blocks carbonated at a temperature of 210° C. and a pressure of 2 MPa, showed large cracks, which make them unsuitable for use as construction material. This was due to an overshoot of the temperature of the reactor, which reached 225° C., hence exceeding the boiling point of water at 2 MPa, namely 212° C. Results at 210° C. and 2 MPa have hence been discarded from table 3. In an additional example, six compacts made from powder 1 following same procedures as above were carbonated at 140° C. for the first 6 hours and at 225° C. for the remaining 12 hours. Also these compacts showed large cracks after carbonation. It was observed that only an outer shell of about 5 mm thickness was well carbonated in the latter compacts. The reason for cracking is ascribed to the temperature exceeding the boiling point of water at 2 MPa, which is 212° C.

Table 4 presents measurement data on density, intrinsic permeability, porosity and water absorption and compares values of non-carbonated compacts and carbonated blocks. Compaction was carried out as indicated above. Carbonation was carried out at the indicated pressures and 140° C. for 18 hours. The water absorption of the blocks was determined by submersion in water at atmospheric conditions during 48 hours (based on method NBN EN 13755 (2002)). The water absorption of the carbonated blocks was substantially lower than the non-carbonated compacts.

The porosity of the blocks was determined using Hg-porosimetry (Quantachrome, Poremaster-60-GT). The Hg-porosity measures the broadest range of pore sizes and appears to be the most reliable. It appears from the results of table 4 that, during the carbonation treatment as indicated, the porosity is significantly reduced. Table also includes porosity data from $N_2$ porosimetry measurements (Quantachrome, NOVA 300) and image analysis. The range of pore size that is measurable with each of the three techniques is indicated as well.

The intrinsic permeability was measured using a capillary flow porometer (Porous Materials Inc., type CFP-1200-A). Intrinsic permeability values were also calculated based on the Kozeny-Carman equation, wherein the values used for n were determined by Hg intrusion.

Blocks made of powder 1 and powder 2 were subsequently broken for analysis. The blocks were broken and dried at 60° C. in an oven to constant weight, ground and analyzed for mineralogical changes using X-ray diffraction. FIG. 2 presents the results. Subsequently, the broken fragments of the blocks were impregnated with epoxy before being sectioned and polished for examination using petrography (electron microscopy), scanning electron microscopy (SEM) and electron probe micro-analysis (SPMA). This was done to study the mineralogical and chemical changes that occur in the blocks due to carbonation and to examine the occurrence of Mo and Cr in the carbonated blocks as well as to examine the change of porosity in the blocks due to carbonation.

In order to test the immobilisation of Mo and Cr in the carbonated blocks, the mobility of Cr and Mo was determined in blocks originating from powder 2 and carbonated at different pressures and at a temperature of 140° C. during 18 hours. The blocks were immersed in liquid (pure water with conductivity <0.2 µS/m) during 24 h in a liquid to volume ratio of 4.5. The concentration of Mo and Cr in the liquid were measured with ICP-AES (according to compendium method CMA/2/I/B.1 of Flemish legislation) after a contact time of 6 h (referred to as duration D1) and after an additional contact time of 18 h (referred to as duration D2). The solution was renewed after the initial contact time D1. The pH and the conductivity of the solution were also measured. The results are presented in FIG. 3 and compared with non-carbonated compacts. A decrease in elution of more than a factor 4 to 8 is observed between the non-carbonated and the carbonated specimens. The concentration of Cr in the solutions after contact with the carbonated specimens was below the detection limit (<5 µg/l). The concentration of Mo in the solutions after contact with the carbonated materials was below or around the detection limit (10-20 µg/l). These test results give a first indication that the blocks are safe for use as a construction material.

Table 5 illustrates the influence of carbonation temperature on the elution (leaching) of Cr and Mo. The same test as identified above (for FIG. 3) was carried out on carbonated blocks and non-carbonated compacts made of powder 1. Increasing the carbonation temperature for a same carbonation pressure (2 MPa) enables to decrease the elution up to a factor 3. The results of table 5 show that elevated carbonation temperatures 70° C.) enable to obtain blocks that are safe for use as a construction material.

In order to test the immobilization of Mo and Cr in the carbonated material (the blocks), batch leaching tests (EN-12457-4) were performed. The carbonated blocks originating from powder 2 and carbonated at 140° C. and various ($CO_2$) pressures for 18 hours are comminuted to particles having a size less than 10 mm. The particles are brought in contact with a solution (pure water, conductivity <0.2 µS/m) for 24 hours. The liquid to solid ratio was 10 litre/kg dry matter (L/S=10). The results for the elution of Mo and Cr are shown in FIG. 4 and compared to the original (non-carbonated) compacts. A decrease in elution of a factor 3 to 6 is observed. Same batch leaching tests were performed on powder 1 blocks, which were carbonated at a pressure of 2 MPa and different temperatures. Table 6 presents the results. The elution of Mo and Cr at 100° C. and 140° C. is significantly lower than at 60° C.

Furthermore, the same test as indicated above was carried out to test the elution of the following elements: Sb, As, Cd, Cu, Pb, Ni, Se and Zn. However, for those elements, concentrations were all below the detection limit (0.70 µg/l for Cd, 1 µg/l for Sb and Se, 5 µg/l for Cu, 10 µg/l for As and Pb and 20 µg/l for Ni and Zn).

Petrographic examination of the non-carbonated and carbonated specimens as identified above showed that at least part of the molybdenum (that was not present as metallic phase) in the carbonated specimen was converted to calcium molybdate ($CaMoO_4$). At least a large fraction of the calcium molybdate is embedded in aluminium silicates and/or in the carbonate matrix of the carbonated specimen.

The decreased leachability results can moreover be ascribed to the carbonation reactions carried out according to the present invention. Indeed, the contaminants that are freed within the reacting phases can on the one hand be eluted by the water which is formed by the carbonation reactions, which is subsequently expelled from the compact when the pores are reduced by the formation of carbonates and moreover get saturated by the formed water. Such water is present in a liquid state as the temperature remains below boiling point according to the invention. On the other hand, these contaminants can react as indicated above and be encapsulated due to the mineralogical changes occurring by the reactions taking place.

The amount of water expelled from the compacts in the reacting step was determined experimentally. A total of 36 compacts were made from powder 1 (12% wt. moisture content), having dimensions of 62×62×37 mm after compaction under same conditions as indicated above were carbonated for 16 hours at 2 MPa and temperatures of 70, 140 and 190° C. (six compacts were carbonated for each test with total weight for the six compacts of about 1.2 kg; tests were performed twice). After the reacting step, the amount of liquid water present at the bottom of the reactor was measured and related to the dry weight of the compacts. The amount of water expelled from the compacts amounted to 17-21 ml/kg dry matter of compact for the reaction at 70° C., 46-51 ml/kg dry matter of compact for the reaction at 140° C. and 48 ml/kg dry matter of compact for the reaction at 190° C. The collected liquid water contained elevated concentrations of Ca, Si and Mo.

Preferably, the reaction conditions (temperature and/or pressure), the granular material, the porosity and the moisture content of the compact are so chosen, that at least 35 ml water/kg dry weight of compact is expelled from the compact in the reacting step, more preferably at least 40 ml water/kg dry compact weight, most preferably at least 45 ml water/kg dry compact weight. The pressure is preferably at least 1 MPa. The temperature is preferably at least 100° C., more preferably at least 110° C., most preferably at least 120° C. The amount of water expelled from the compact can in addition be linked to the amount of carbonates formed in the reacting step. The kind of granular material can affect the mount of water formed during carbonation.

Methods of the invention hence advantageously allow to reduce the leachability of contaminants in a granular material by carbonation.

TABLE 3

Minimum and maximum values of compressive strength of compacted (182 kg/cm$^2$), carbonated (18 hours) blocks comprising stainless steel slag. Test according to NBN B 15-220.

| Pressure (MPa) | Temperature (° C.) | Powder 1 blocks (MPa) | Powder 2 blocks (MPa) |
|---|---|---|---|
| 0.5 | 140 | 29.5-31.3 | 8.3-10.2 |
| 1 | 140 | — | 11.6-15.3 |
| 2 | 70 | 26.3-26.5 | — |
| 2 | 100 | 41.7-46.7 | — |
| 2 | 140 | 31.5-51.6 | 10.9-32.0 |
| 5 | 140 | — | 11.3-44.0 |
| 7.5 | 140 | 45.0-66.4 | 33.1-35.0 |
| 10 | 140 | — | 38.8-50.3 |
| 14 | 140 | 40.2-65.9 | 32.9-34.1 |

TABLE 4

Density, intrinsic permeability, water absorption and porosity of carbonated (140° C., 18 h, pressure as indicated) and non-carbonated compacts (182 kg/cm$^2$).

| pressure MPa | granular material | He density (g/cm$^3$) | Density (g/cm$^3$) | Permeability calculated (cm$^2$) | Permeability measured (cm$^2$) | porosity (%) N2 (0.0003-0.3 μm) | porosity (%) Hg (0.003-200 μm) | image analysis (≥1 μm) | water-absorption weight % |
|---|---|---|---|---|---|---|---|---|---|
| nc | Powder 1 | 2.91 | 1.88-1.99 | 2.1 10$^{-10}$-3.1 10$^{-10}$ | 2.11 10$^{-10}$-8.36 10$^{-10}$ | 10.3-14.9 | 31.8-35.2 | 20.4 | 21.5-24.4 |
| 2 | Powder 1 | 2.79-2.81 | 2.07-2.1 | | 8.18 10$^{-11}$ | 4.6-11.8 | 24.9-26.4 | 13.0 | 11.4-11.8 |
| 14 | Powder 1 | 2.81 | 2.3 | | 6.25 10$^{-11}$ | 7.5 | 18.1 | 10.4 | 11.7 |
| nc | Powder 2 | 2.72 | 1.93 | 3.7 10$^{-10}$ | | 12.4 | 29.1 | | 19.6 |
| 0.5 | Powder 2 | 2.42-2.58 | 1.92-1.96 | | | | 18.8-25.7 | | |
| 1 | Powder 2 | 2.52-2.62 | 2.04-2.08 | | | 13.3 | 19.3-20.4 | | 7.6 |
| 2 | Powder 2 | 2.71 | 2.12 | | | 8.3 | 21.8 | | 7.6 |
| 7.5 | Powder 2 | | | | | 6.0 | | | 8.0 |
| 14 | Powder 2 | 2.67 | 2.15 | | | 4.9 | 19.5 | | |
| nc | BA | 2.77 | 1.83 | 1.7 10$^{-9}$ | | | 34.1 | 11.7 | 16.8 |
| 2 | BA | 2.75 | 1.79 | | | | 35 | 10.0 | 15.9 |
| nc | PS | 2.73 | 2.1 | 1.5 10$^{-11}$ | | | 23.0 | 23.0 | — |
| 2 | PS | 2.49 | 2.09 | | | | 16.2 | | 11.4 |
| 2 | PS | | | | | | | 13.1 | |
| nc | SS | 2.56 | 1.55 | 1.3 10$^{-8}$ | | 7.9 | 39.3 | | 24.4 |
| 2 | SS | 2.57 | 1.67 | | | 5.0 | 34.9 | | 21.6 |

BA: MSWI bottom ash,
PS: phosphorus slag + 30% wt sea sand,
SS: calcium silicate stone.
"nc" indicates not carbonated specimen.

TABLE 5

Concentration of Cr and Mo in solution (μg/l) after immersion of non-carbonated and carbonated (18 h) compacted (182 kg/cm$^2$) powder 1 blocks in the solution. Blocks immersed in liquid (pure water with conductivity <0.2 μS/m) during 24 h in a liquid to volume ratio of 4.5. Concentrations of Mo and Cr measured with ICP-AES (according to compendium method CMA/2/I/B.1 of Flemish legislation) after a contact time of 6 h and additional contact time of 18 h. The solution was renewed after 6 h.

| Pressure (MPa) | Temperature (° C.) | Contact time (hours) | Mo (μg/l) | Cr (μg/l) |
|---|---|---|---|---|
| nc | nc | 6 | 54 | 40 |
| 2 | 60 | 6 | 36 | <5 |
| 2 | 100 | 6 | 28 | <5 |
| 2 | 140 | 6 | 11 | <5 |
| nc | nc | 18 | 78 | 61 |
| 2 | 60 | 18 | 58 | 12 |
| 2 | 100 | 18 | 26 | 12 |
| 2 | 140 | 18 | 17 | <5 | nc indicates non-carbonated, compacted blocks.

TABLE 6

Results of batch leaching tests (EN 12457-4) of carbonated (18 h) and non-carbonated compacted (182 kg/cm$^2$) blocks of powder 1. Blocks comminuted to particles having a size less than 10 mm. The particles are brought in contact with a solution (pure water, conductivity <0.2 μS/m) for 24 hours. The liquid to solid ratio was 10 liter/kg dry matter (L/S = 10).

| Pressure (MPa) | Temperature (° C.) | Mo (μg/l) | Cr (μg/l) |
|---|---|---|---|
| nc | nc | 420 | 660 |
| 2 | 60 | 430 | 600 |
| 2 | 100 | 190 | 230 |
| 2 | 140 | 140 | 14 |

"nc" indicates non carbonated specimen.

Comparative Tests with Nitrogen

In order to test possible hydraulic binding properties of powder 1 material, six same compacts of powder 1 as indicated above (62×62×32 mm after compaction under 182 kg/cm$^2$ and same moisture content) were formed. A first compact was tested for green strength according to indicated procedures and a compressive strength was measured of 4.4 MPa. The remaining five compacts were treated in the same reactor in a nitrogen atmosphere of 20 bar and 140° C. maximal temperature. The reactor, at ambient temperature of about 20° C., was first pressurized until 1.4 MPa with nitrogen, whereafter it was heated to 140° C. (at about 2° C./min). The blocks were kept at indicated pressure (2 MPa) and temperature for 16 hours, whereafter the reactor was cooled down during 1 hour (2° C./min). The treated compacts resulted not solidified (they fell apart upon contact) and had no compressive strength.

Consequently, it can be said that the stainless steel slag used (powder 1) has no hydraulic binding properties, and that the additional strength obtained by the carbonation reaction according to the invention is practically completely due to the carbonates formed.

Larger Dimensions

Methods of the invention can successfully be applied to carbonate larger compacts. Three compacts having dimensions 120×55×46 mm after compaction under 182 kg/cm$^2$ compaction pressure were made from powder 1 (12% wt moisture). After carbonation at 20 bar and 140° C. during 16 hours, the compressive strength was determined after 7 days according to EN 12390-3. The measured values were: 57.3/54.8/51.4 MPa.

Cylindrical compacts of diameter 72 mm and height 125 mm were successfully carbonated as well.

Other Mineral Materials

In the following example, phosphorus slag, calcium silicate stone and MSWI-bottom ash are each separately used as granular material (powder) in the method of the invention. Phosphorus slag refers to the residue that is formed in the production of phosphorus. Calcium silicate stone refers to a construction material that is produced at elevated temperature (up to 200° C.) and pressure (up to 2 MPa). MSWI bottom ash refers to the ash residue that is generated with the incineration of municipal waste.

The mineralogical composition of above indicated materials is presented in table 7.

The chemical composition is presented in table 8. The chemical composition of the identified micro-elements was determined by digesting the solid particles in HF/HNO$_3$/HCl solution according to compendium method CMA2/II/A.3 of the Flemish legislation and subsequently measuring the concentrations with ICP-AES according to compendium method CMA/2/I/B.1. The chemical composition of the macro-elements was determined using fusion-XRF (X-ray fluorescence) (ISO 14869-2002/EN 15309:2007).

Figure 6:
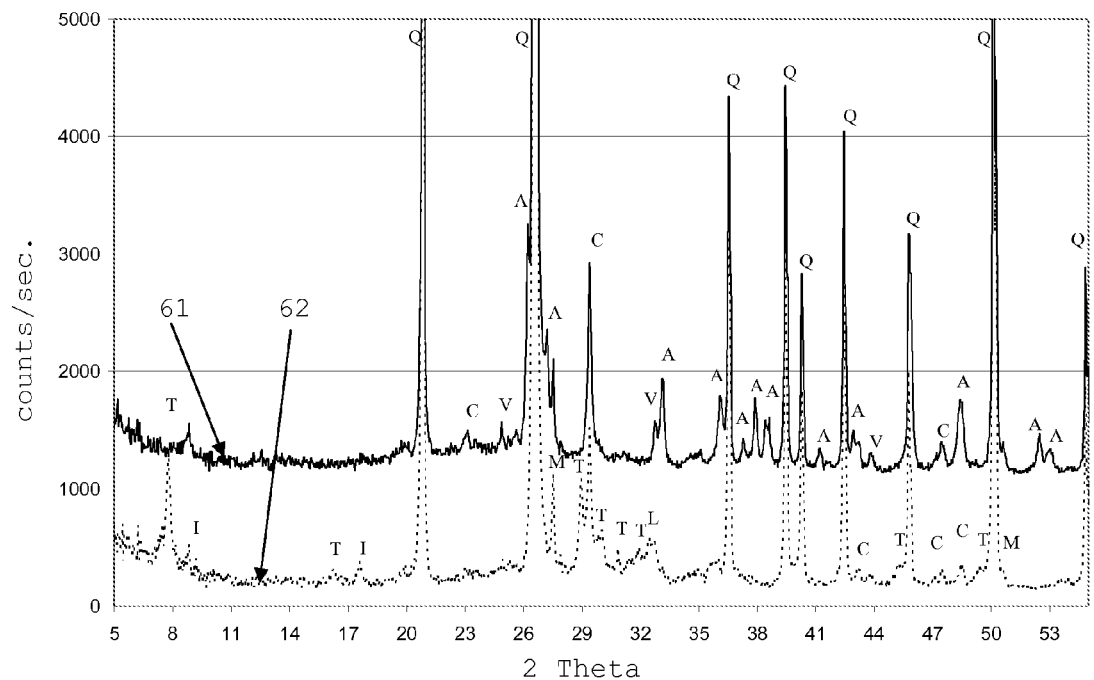
FIG. 6A represents XRD diffraction patterns of calcium silicate stone. Pattern 61 refers to a compacted (182 kg/cm$^2$) carbonated (140° C., 2 MPa, 18 hours) specimen and pattern 62 to a compacted non carbonated specimen. C=Calcite (CaCO$_3$); A=Aragonite (CaCO$_3$); V=Vaterite (CaCO$_3$); M=Microcline (KAlSi$_3$O$_8$); Q=Quartz (SiO$_2$); T=Tobermorite (Ca$_{2.25}$(Si$_3$O$_{7.5}$(OH)$_{1.5}$)(H$_2$O)); I=Illite (KAl$_2$Si$_3$Al)O$_{10}$(OH)$_2$; L=Larnite or C2S(Ca$_2$SiO$_4$).
FIG. 6B represents XRD diffraction patterns of MSWI bottom ash. Pattern 63 refers to a compacted (182 kg/cm$^2$) carbonated (140° C., 2 MPa, 18 hours) specimen and pattern 64 to a compacted non carbonated specimen. P=Portlandite (Ca(OH$_2$), C=Calcite (CaCO$_3$), A=Ankerite (Ca(Fe,Mg)(CO$_3$)$_2$), B=Barite (BaSO$_4$), H=Haematite (Fe$_2$O$_3$), G=Gehlenite Ca$_2$Al$_2$SiO$_7$, Q=Quartz (SiO$_2$).
FIG. 6C represents XRD diffraction patterns of phosphorus slag. Pattern 65 refers to a compacted (182 kg/cm$^2$) carbonated (140° C., 2 MPa, 18 hours) specimen and pattern 66 to a compacted non carbonated specimen. C=Calcite (CaCO$_3$), W=wollastonite (Ca(SiO$_3$)) and pseudowollastonite (Ca$_3$(SiO$_3$)$_3$), Cu=Cuspidine (Ca$_4$Si$_2$O$_7$F$_2$), Q=Quartz (SiO$_2$).
Figure 6:
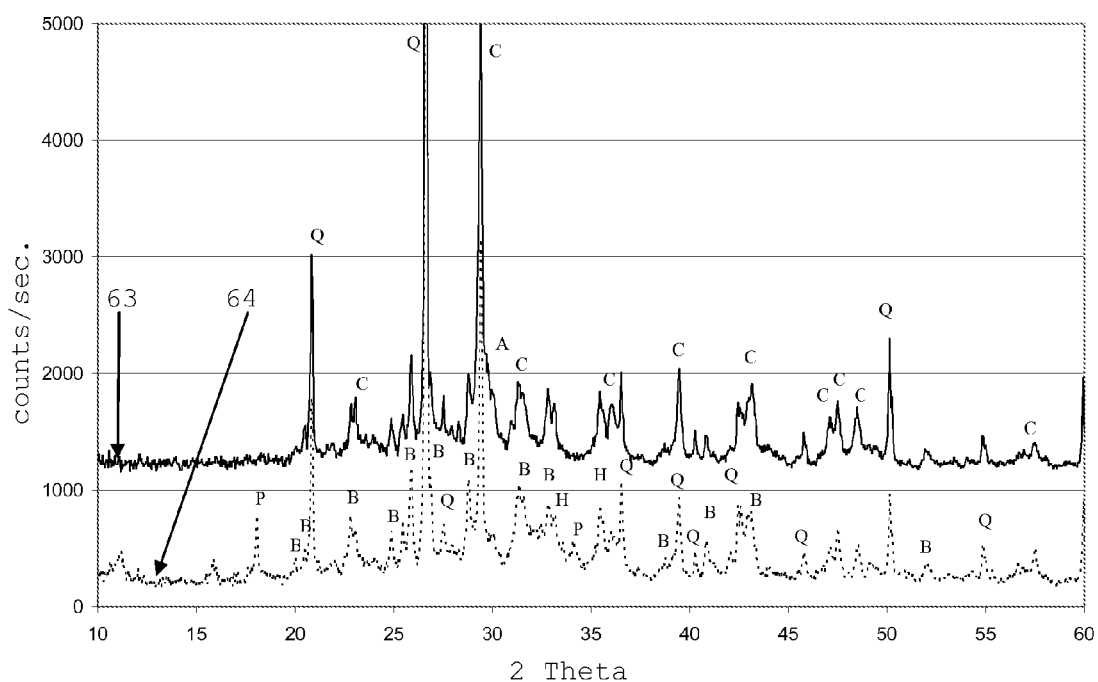
Figure 6:
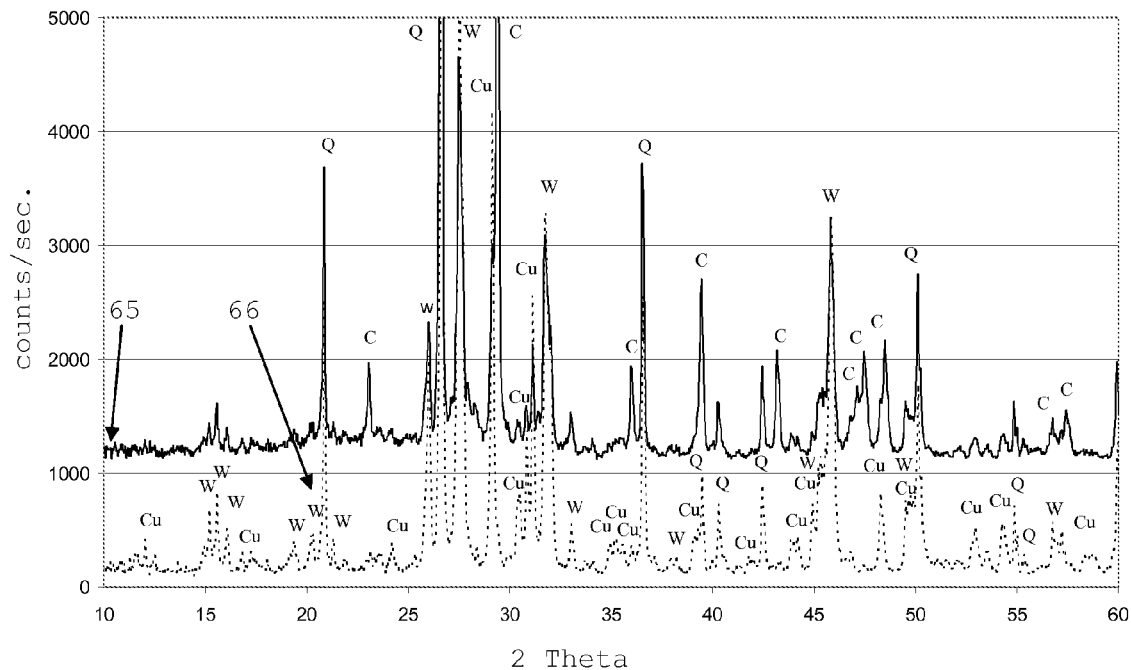

The mineralogical composition (crystalline phases) was determined by scanning from 2° (2θ) to 120° (2θ) using a Philips X'Pert X-ray diffractometer using CuKα radiation (40 kV). The results are presented in FIG. 6.

Figure 5:
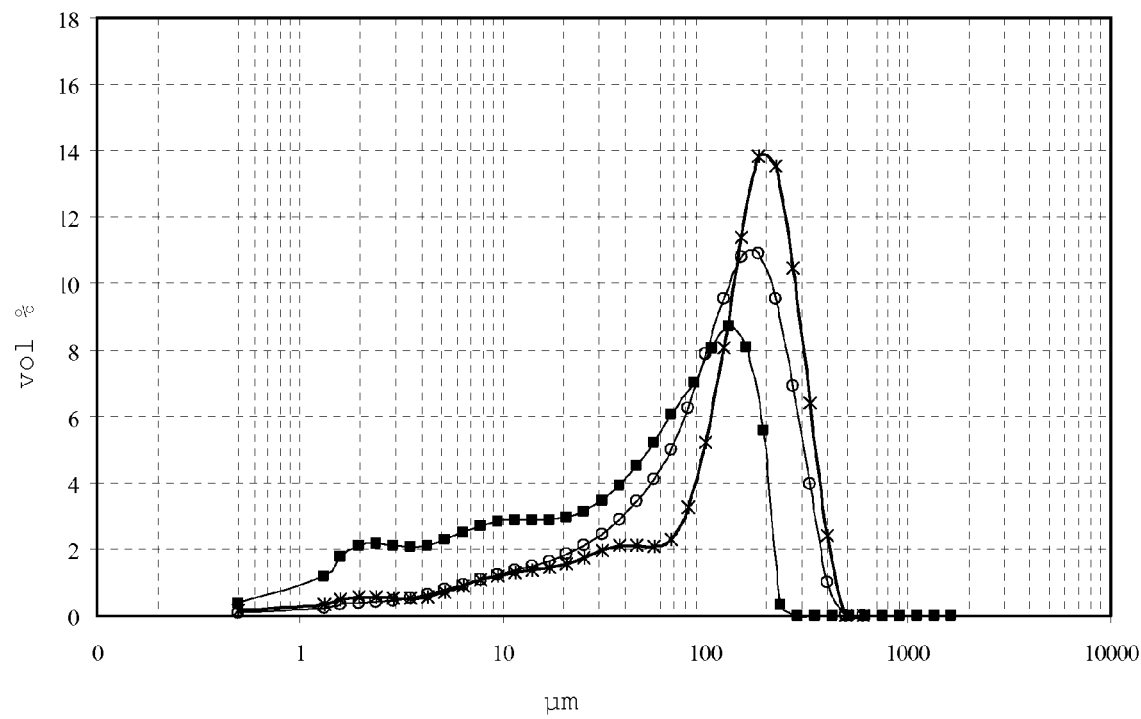
FIG. 5 represents the particle size distribution of calcium silicate stone (-*-), municipal solid waste incinerator (MSWI) bottom ash (-○-) and phosphorus slag (-■-).
Figure 5:
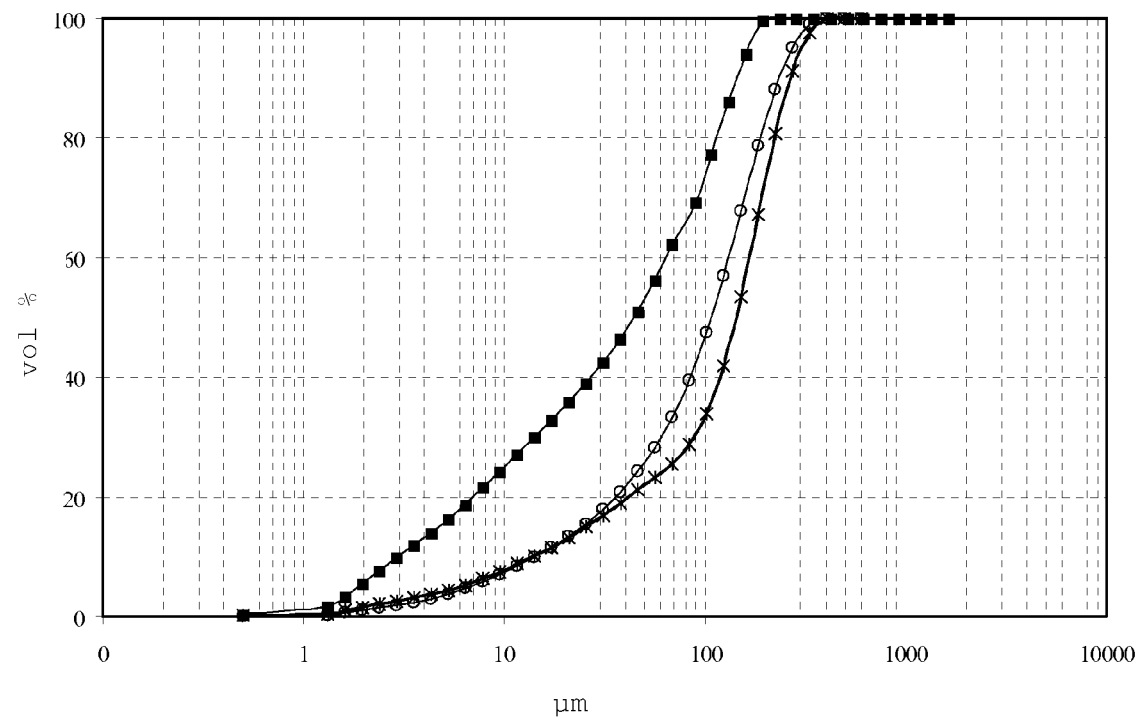

A granular material (powder) was obtained from above (mineral) materials by grinding. The size distribution of the granular material is presented in FIG. 5. The particle size distribution was determined using a Mastersizer (Malvern Instruments) laser diffractometer.

The pH of the granular material was measured after grinding to a particle size <250 μm. The obtained particles (solid) were suspended in pure water (L/S=10) and the suspension was shaken end-over-end during 1 hour. Subsequently, the pH of the liquid in contact with the particles was measured after settling of the latter. The pH measured 11.0 for the phosphorus slag, 10.2 for the calcium silicate stone and 11.5 for the MSWI-bottom ash.

The phosphorus slag was mixed with 30% by weight of sea sand to obtain a granular material indicated by "PS". The calcium silicate stone ("SS") and the MSWI-bottom ash ("BA") were used without the additions of other materials. The moisture content of the granular materials (powders) was then adjusted to 12% by weight.

The granular materials (powders) were cast in moulds having dimensions of 62×62×62 mm and were then compacted with the aid of a hydraulic press with a compaction pressure of 182 kg/cm$^2$. The resulting compacts measured 62×62×32 mm.

The compacts were put in a reactor (autoclave) for carbonation during 18 h. Reaction temperature was 140° C. A carbon dioxide atmosphere of 2 MPa was used. The atmosphere was regularly supplied with carbon dioxide gas in order to maintain the pressure at the level as indicated. Six replicate blocks of each granular material (powder) were produced.

Compressive strength tests were carried out on the carbonated blocks as indicated above after 7 days of aging using a Instron 8502 and a cross-head speed of 5 mm/min (according to NBN B15-220). Table 9 lists the results. Compressive strengths as high as 31 MPa on average can be obtained for material PS. On the other hand, the calcium silicate stone (SS) and the MSWI bottom ash (BA), appear to be less performing as far as material strength is concerned.

TABLE 7

Mineralogical composition of phosphorus slag, calcium silicate stone and MSWI bottom ash.

| | MSWI Bottom ash | Phosphorus slag | Calcium Silicate stone |
|---|---|---|---|
| OXIDES AND HYDROXIDES | | | |
| portlandite (Ca(OH)$_2$) | ++ | | |
| Periclase (MgO) | + | | |
| Haematite (Fe$_2$O$_3$) | + | | |
| Magnetite-chromite | + | | |
| SILICATES | | | |
| Quartz (SiO$_2$) | +++ | | +++ |
| C$_2$S (Ca$_2$SiO$_4$) | + | | ++ |
| wollastonite Ca(SiO$_3$) | + | +++ | |
| pseudowollastonite Ca$_3$(SiO$_3$)$_3$ | | +++ | |
| Cuspidine Ca$_4$Si$_2$O$_7$(F,OH)$_2$ | | +++ | |
| Hedenbergite | + | | |
| Mellilite Group (Akermanite-Gehlenite) | ++ | | |
| Monticellite (CaMgSiO$_4$) | + | | |
| tobermorite (Ca$_{2.25}$(Si$_3$O$_{7.5}$(OH)$_{1.5}$)(H$_2$O) | | | +++ |
| illite (KAl$_2$Si$_3$Al)O$_{10}$(OH)$_2$ | | | ++ |
| muscovite KAl$_2$(Si$_3$Al)O$_{10}$(OH)$_2$ | | | ++ |
| Zeolites | + | | |
| CARBONATES | | | |
| calcite (CaCO$_3$) | ++ | | ++ |
| aragonite (CaCO$_3$) | | | |
| vaterite (CaCO$_3$) | | | |
| ankerite (Ca(Fe,Mg)(CO$_3$)$_2$) | | | |
| SULPHATES | | | |
| barite BaSO$_4$ | ++ | | |
| ettringite | + | | |
| AMORPHOUS PHASES | +++ | + | |

TABLE 8

Chemical composition of phosphorus slag, calcium silicate stone and MSWI bottom ash. Values measured on a sample according to ICP-AES (micro-elements) and fusion-XRF (macro-elements).

| Element | Unit | Calcium silicate stone | MSWI-bottom ash | Phosphorus slag |
|---|---|---|---|---|
| Macro-elements | | | | |
| Al$_2$O$_3$ | % weight | 2.7 | 7.3 | 2.4 |
| CaO | % weight | 9.1 | 20.5 | 45 |
| Fe$_2$O$_3$ | % weight | 1.0 | 12.4 | 0.08 |
| MgO | % weight | 0.29 | 1.8 | 0.54 |
| MnO | % weight | 0.01 | 0.19 | 0.03 |
| SiO$_2$ | % weight | 77 | 42 | 38 |
| P$_2$O$_5$ | % weight | 0.02 | 1.3 | 1.7 |
| K$_2$O | % weight | 0.58 | 1.3 | 0.23 |
| TiO$_2$ | % weight | 0.26 | 1.4 | 0.15 |
| NaO | % weight | 0.11 | 4.7 | 0.63 |
| Micro-elements | | | | |
| Cr | mg/kg | 22 | 350 | <15 |
| Mo | mg/kg | <1.5 | 17 | <1.5 |
| Sb | mg/kg | <10 | 170 | <10 |
| As | mg/kg | 4.6 | 17 | <4.0 |
| Ba | mg/kg | 99 | 24000 | 300 |
| Cd | mg/kg | <0.40 | 11 | <0.40 |
| Co | mg/kg | 3 | 770 | <2.0 |
| Cu | mg/kg | <5.0 | 2400 | <5.0 |
| Hg | mg/kg | <0.10 | 0.49 | <0.10 |
| Pb | mg/kg | <13 | 1200 | <13 |
| Ni | mg/kg | 5.1 | 180 | <3.0 |
| Se | mg/kg | <10 | <10 | <10 |
| Sn | mg/kg | <10 | 230 | <10 |
| V | mg/kg | 21 | 54 | 17 |
| Zn | mg/kg | 21 | 4400 | 29 |

TABLE 9

Compressive strength of compacted (182 kg/cm$^2$) carbonated (140° C., 2 MPa CO$_2$, 18 hours) blocks comprising fine grained phosphorus slag (30% by wt sea sand), calcium silicate stone and MSWI-bottom ash. Tests according to Belgian standard NBN B 15-220.

| | Compressive strength (MPa) |
|---|---|
| Carbonated Phosphorus slag mixed with sea sand (70/30 by weight) | 31 |
| Carbonated Calcium silicate stone | 15 |
| Carbonated MSWI-bottom ash | 12.5 |

TABLE 10

Results of the batch leaching test (EN12457-4) on carbonated blocks ("BA": MSWI bottom-ash, "PS": phosphorus slag mixed with 30% by weight of sea sand, "SS": calcium silicate stone). The materials were carbonated during 18 hours at 2 MPa and 140° C. The carbonated material is indicated with "C". The non-carbonated material is indicated with "NC".

| | BA NC | BA C | PS NC | PS C | SS NC | SS C |
|---|---|---|---|---|---|---|
| As (µg/l) | <10 | <10 | <10 | <10 | <10 | <10 |
| Ba (µg/l) | 600 | 83 | 89 | 13 | <20 | <10 |
| Cd (µg/l) | <1 | <1 | <1 | <1 | <1 | <1 |
| Cr (µg/l) | 67 | 23 | <5 | <5 | <5 | <5 |
| Cu (µg/l) | 1300 | 180 | <10 | <10 | <10 | 5.1 |
| Pb (µg/l) | 11 | <10 | <10 | <10 | <10 | <10 |
| Mo (µg/l) | 160 | 43 | <10 | <5 | <10 | <10 |
| Ni (µg/l) | <20 | <10 | <10 | <10 | <10 | <10 |
| Se (µg/l) | <10 | <20 | <10 | <10 | <10 | <10 |
| Zn (µg/l) | 39 | 12 | <20 | <20 | <20 | <10 |

Table 4 presents measurement data on density, porosity and water absorption and compares values of non-carbonated compacts and carbonated blocks for the above three granular materials as well. Compaction and carbonation were carried out as indicated above. The water absorption of the blocks was determined by submersion in water at atmospheric conditions during 48 hours (based on method NBN EN 13755 (2002)). It appears from table 4, that for the bottom ash (BA) and the silicate stone (SS) materials, no significant decrease in porosity and water absorption is obtained after carbonation. Those two materials do not appear to be particularly interesting for being used as such as a granular material for a method of the invention. However, they can be mixed with other (more reactive) granular materials.

The pH of the carbonated blocks was measured after grinding to a particle size <250 µm, suspending the solid (particles) in a solution (pure water, conductivity <0.2 µS/m) with a liquid to solid ratio of 10 litre/kg dry matter (L/S=10) and shaking the suspension end-over-end during 1 hour. Subsequently, the pH of the liquid in contact with the particles was measured after settling of the latter. The pH of the carbonated PS material measured 9.8, the pH of the carbonated calcium silicate stone measured 9.0 and the pH of the carbonated MSWI-bottom ash measured 9.2.

In order to test the environmental quality of the carbonated materials, batch leaching tests (according to EN 12457-4) were performed. The carbonated blocks, ground to a particle size as identified above (<250 μm), were brought in contact with a solution (pure water, conductivity <0.2 μS/m) for 24 hours. The liquid to solid ratio was 10 litre/kg dry matter (L/S=10). Elution of As, Ba, Cd, Cr, Cu, Pb, Mo, Ni, Se and Zn was measured. Table 10 presents the measured data and compares to the original (non-carbonated) granular material. A decrease in elution of a factor 3 tot 6 is observed.

It should be noted that according to the standard EN 12457-4, it is only necessary to comminute the material to particles having a size less than 10 mm. Since the material, which was used in the above described test was finely ground (particle size <250 μm), the results of table 10 present a worst-case scenario with regard to the environmental quality of the carbonated material.

The broken blocks were then dried at 60° C. in an oven to constant weight, ground and analyzed for mineralogical changes using X-ray diffraction by scanning from 2° (2θ) to 120° (2θ) using a Philips X'Pert X-ray diffractometer using CuKα radiation (40 kV). The results are presented as graph 61 in FIG. 6.

In the article produced from phosphorus slag (PS), calcite was formed. A significant decrease in cuspidine, pseudowollastonite and wollastonite was observed. The carbonated and non-carbonated material comprised a small amount of amorphous phases. It should be noted that oxides and hydroxides could not be detected in the non-carbonated material (using XRD), hence the participating (active) mineral compounds in the phosphorus slag are neither oxides, nor hydroxides, but are indeed silicates.

In the article produced from calcium silicate stone, calcite, aragonite and vaterite were formed. A significant decrease in tobermorite, $C_2S(Ca_2SiO_4)$ and illite (to a lesser degree) was observed. It should be noted that oxides and hydroxides could not be detected in the non-carbonated material (using XRD), hence the participating (active) mineral compounds in the calcium silicate stone are neither oxides, nor hydroxides, but are indeed silicates.

In the article produced from MSWI-bottom ash, calcite and aragonite were formed. A significant decrease in portlandite was observed.

Figure 7:
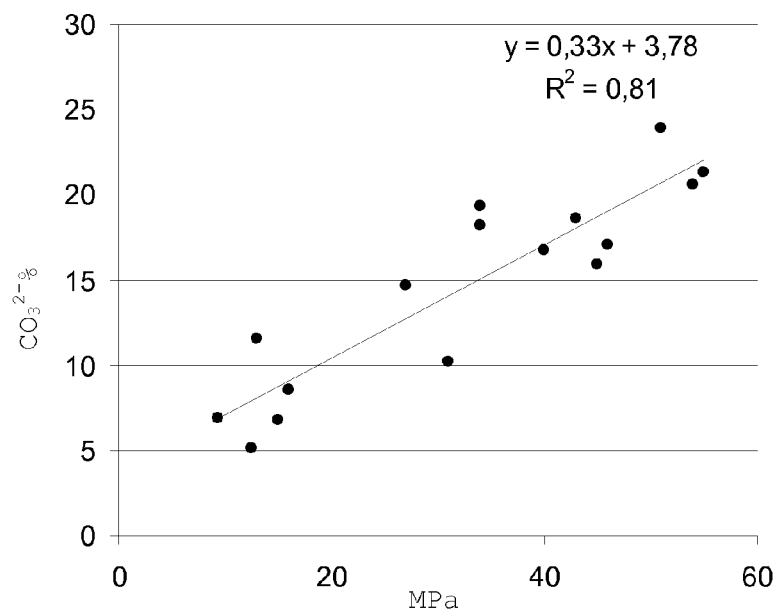
FIG. 7 represents correlation data between the amount of carbonates formed and the compressive strength of the carbonated articles originating from stainless steel slag and phosphorus slag.

FIG. 7 shows the correlation between formed carbonates (% by weight) and the compressive strength of the carbonated article, based on the measured values of both stainless steel slag articles (powder 1 and powder 2 blocks), phosphorus slag (PS), MSWI bottom ash (BA) and calcium silicate stone (SS) as used in the above example. The regression line results to be Y=3.78+0.33X (X=compressive strength [MPa], Y=carbonates formed [% by wt]) and $R^2$=0.81 with number of samples n=16.

Comparative Example

A comparative example is included showing the effect of porosity and intrinsic permeability on the strength of the carbonated article. In a first, comparative example, a granular material consisting of 60% by weight LD slag (0/0.5 mm), 20% by weight LD slag (0.5/2 mm), 10% by weight stainless steel slag (2/8 mm) and 10% by weight stainless steel slag (8/16 mm) was poured into a proctor mould and proctor compacted. Compacts of 100 mm diameter and 120 mm height were obtained. The moisture content was 12% by weight. Intrinsic permeability of the compacts was determined using a capillary flow porometer (Porous Materials Inc., type CFP-1200-A) and a value of $6.9 \times 10^{-7}$ cm² was measured. A porosity of the compacts of 41% was determined using the true density, volume and dry weight of the non-carbonated compact.

The compacts were carbonated for 16 hours in a nearly 100% $CO_2$ atmosphere at 2 MPa and 80° C. The compressive strength was determined according to Belgian standard NBN B 15-220 and values between 5.6 and 6.9 MPa were obtained.

Hence, porosity and/or intrinsic permeability values outside of ranges as indicated can have a negative effect on the strength of the carbonated articles.

The invention claimed is:

1. A method of producing a carbonate bonded article by carbonation, the method comprising the steps of:
providing a granular material having a pH higher than or equal to 8.3, the granular material comprising at least one alkaline earth metal silicate phase,
compacting the granular material with a compaction pressure of at least 5 MPa to obtain a compact of the granular material, wherein the porosity of the compact is smaller than or equal to 37% by volume and wherein the intrinsic permeability of the compact is at least $1 \cdot 10^{-12}$ cm²,
transporting the compact to a reactor, and
reacting in the reactor the granular material in the compact with carbon dioxide in the presence of water to form at least 5% by weight of carbonates ($CO_3^{2-}$) thus transforming the compact into the carbonate bonded article, wherein the compact is unsaturated with moisture at the beginning of reacting step, wherein the compact in the reactor is in an atmosphere comprising the carbon dioxide, wherein the atmosphere is at a temperature of at least 70° C. and at a pressure of at least 0.5 MPa so that the alkaline earth metal silicate phase contributes to formation of the carbonates, the pressure being higher than a saturated vapour pressure of water at the temperature,
wherein the granular material is free of material having hydraulic binding properties or comprises an amount thereof such that a compressive strength of the carbonate bonded article is more than two times a strength of a same compact treated in a nitrogen atmosphere free of carbon dioxide under same conditions as in the reacting step following 28 days of aging subsequent to the reacting or nitrogen treatment step.

2. The method according to claim 1, wherein the granular material is free of material having hydraulic binding properties or comprises at most such an amount thereof that at most 2.2% by weight of calcium silicate hydrate phases are formed in the carbonate bonded article.

3. The method according to claim 1, wherein the granular material is free of material having hydraulic binding properties or comprises at most such an amount thereof that the compressive strength of the carbonate bonded article is at least three times the strength of a same compact treated in a nitrogen atmosphere free of carbon dioxide under same conditions as in the reacting step.

4. The method according to claim 1, wherein in the reacting step at least 10% by weight of carbonates ($CO_3^{2-}$) are formed.

5. The method according to claim 1, wherein the compacting step comprises compacting the granular material with a compaction pressure of at least 10 MPa.

6. The method according to claim 1, wherein the partial $CO_2$ pressure in the atmosphere attains a value higher than or equal to 0.1 MPa during the reacting step.

7. The method according to claim 1, wherein at least 37g $CO_2$ per kg dry matter of the compact is made to react with the granular material.

8. The method according to claim 1, wherein the atmosphere is at a pressure of at least 1 MPa.

9. The method according to claim 1, wherein the atmosphere is at a temperature of at least 90° C.

10. The method according to claim 1, wherein the temperature of the atmosphere is at least 10° C. below the boiling point of water at the pressure.

11. The method according to claim 1, wherein in the reacting step the temperature of the atmosphere is cycled such that it is reduced by at least 10° C. at least once.

12. The method according to claim 1, wherein prior to the reacting step the compact has a porosity falling in the range between 18% and 37% by volume.

13. The method according to claim 1, wherein the compact has a moisture content at the beginning of the reacting step falling in the range between 90% and 20% of a moisture saturation content, wherein the moisture saturation content refers to the moisture content when all pores are saturated with water.

14. The method according to claim 1, wherein the granular material comprises at most 5% by weight ground granulated blast furnace slag.

15. The method according to claim 1, wherein the granular material comprises at most 7% by weight Portland cement and Portland clinker.

16. The method according to claim 1, wherein the granular material comprises a fine fraction consisting of all particles of the granular material having a size smaller than or equal to 500μm, the fine fraction comprising the alkaline earth metal silicate phase and wherein at least 10% by volume of the fine fraction has a particle size smaller than or equal to 50 μm.

17. The method according to claim 1, wherein the granular material comprises a fine fraction consisting of all particles of the granular material having a size smaller than or equal to 500 μm, the fine fraction comprising the alkaline earth metal silicate phase and wherein at least 60% by volume of the fine fraction has a particle size smaller than or equal to 200 μm.

18. The method according to claim 1, wherein the granular material comprises one or more of: slag from metal production processes, slag from the production of phosphorus, bottom ashes and non-coal fly ashes.

19. The method according to claim 18, wherein the granular material comprises at least 20% by weight of the slags and ashes.

20. The method according to claim 18, wherein the slag comprises steelmaking slag.

21. The method according to claim 18, wherein the slag comprises slag from a production process of a non-ferrous metal substance.

22. The method according to claim 1, wherein the compact has an intrinsic permeability of at least $5 \cdot 10^{-12}$ $cm^2$.

23. The method according claim 1, wherein the compact has an intrinsic permeability less than or equal to $5 \cdot 10^{-7}$ $cm^2$.

24. The method according to claim 1, wherein the granular material is free of ground granulated blast furnace slag.

25. The method according to claim 1, wherein the granular material is free of Portland cement and of Portland clinker.

26. The method according to claim 18, wherein the slag comprises stainless steelmaking slag.

27. The method according to claim 21, wherein the non-ferrous metal substance is zinc, copper, or lead.

28. The method according to claim 1, wherein the compact has an intrinsic permeability of at least $1 \cdot 10^{-11}$ $cm^2$.

29. The method according to claim 1, wherein the compact has an intrinsic permeability of at least $5 \cdot 10^{-11}$ $cm^2$.

30. The method according to claim 1, wherein the compact has an intrinsic permeability of at least $1 \cdot 10^{-10}$ $cm^2$.

* * * * *